(12) United States Patent
Mimura et al.

(10) Patent No.: US 10,854,914 B2
(45) Date of Patent: Dec. 1, 2020

(54) SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, AND METHODS FOR MANUFACTURING SHEET FOR ALL-SOLID STATE SECONDARY BATTERY, ELECTRODE SHEET FOR ALL-SOLID STATE SECONDARY BATTERY, AND ALL-SOLID STATE SECONDARY BATTERY

(71) Applicant: FUJIFILM Corporation, Tokyo (JP)

(72) Inventors: Tomonori Mimura, Kanagawa (JP); Hiroaki Mochizuki, Kanagawa (JP); Masaomi Makino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 151 days.

(21) Appl. No.: 16/046,342

(22) Filed: Jul. 26, 2018

(65) Prior Publication Data

US 2018/0342765 A1 Nov. 29, 2018

Related U.S. Application Data

(63) Continuation of application No. PCT/JP2017/002754, filed on Jan. 26, 2017.

(30) Foreign Application Priority Data

Jan. 27, 2016 (JP) ................................. 2016-013762

(51) Int. Cl.
  *H01M 10/0562* (2010.01)
  *H01M 10/0585* (2010.01)
  (Continued)

(52) U.S. Cl.
  CPC .......... *H01M 10/0562* (2013.01); *H01B 1/06* (2013.01); *H01B 1/10* (2013.01);
  (Continued)

(58) Field of Classification Search
  CPC ............ H01B 13/00; H01B 1/06; H01B 1/10; H01M 10/052; H01M 10/0525;
  (Continued)

(56) References Cited

U.S. PATENT DOCUMENTS 4,847,332 A 7/1989 Yu
8,895,194 B2 * 11/2014 Shigeo .............. H01M 10/0562
  252/62.2

(Continued)

FOREIGN PATENT DOCUMENTS

CN 101098026 A 1/2008
JP 02-502387 A 8/1990
(Continued)

OTHER PUBLICATIONS

Extended European Search Report dated Jan. 11, 2019 issued by the European Patent Office in counterpart application No. 17744323.1.
(Continued)

*Primary Examiner* — Victoria H Lynch
(74) *Attorney, Agent, or Firm* — Sughrue Mion, PLLC

(57) ABSTRACT

Provided are a solid electrolyte composition comprising: a specific inorganic solid electrolyte and a binder, in which a polymer constituting the binder includes a macromonomer component having a mass-average molecular weight of 1,000 or more and less than 1,000,000 and includes a ring structure of two or more rings, a sheet for an all-solid state secondary battery, an electrode sheet for an all-solid state secondary battery, and an all-solid state secondary battery for which the solid electrolyte is used, and methods for manufacturing a sheet for an all-solid state secondary bat-
(Continued)

tery, an electrode sheet for an all-solid state secondary battery, and an all-solid state secondary battery.

17 Claims, 1 Drawing Sheet

(51) Int. Cl.
| | |
|---|---|
| H01M 4/62 | (2006.01) |
| H01M 4/139 | (2010.01) |
| H01M 4/133 | (2010.01) |
| H01B 13/00 | (2006.01) |
| H01B 1/10 | (2006.01) |
| H01B 1/06 | (2006.01) |
| H01M 10/052 | (2010.01) |
| H01M 4/587 | (2010.01) |
| H01M 10/0525 | (2010.01) |

(52) U.S. Cl.
CPC ............ *H01B 13/00* (2013.01); *H01M 4/133* (2013.01); *H01M 4/139* (2013.01); *H01M 4/587* (2013.01); *H01M 4/62* (2013.01); *H01M 4/622* (2013.01); *H01M 4/624* (2013.01); *H01M 10/052* (2013.01); *H01M 10/0525* (2013.01); *H01M 10/0585* (2013.01); *H01M 2300/0065* (2013.01); *H01M 2300/0068* (2013.01); *H01M 2300/0082* (2013.01)

(58) Field of Classification Search
CPC ......... H01M 10/0562; H01M 10/0585; H01M 2300/0065; H01M 2300/0068; H01M 2300/0082; H01M 4/133; H01M 4/139; H01M 4/587; H01M 4/62; H01M 4/622; H01M 4/624

See application file for complete search history.

(56) References Cited

U.S. PATENT DOCUMENTS

| | | |
|---|---|---|
| 2005/0034299 A1 | 2/2005 | Kurihara et al. |
| 2008/0124631 A1 | 5/2008 | Fukui et al. |
| 2009/0246632 A1* | 10/2009 | Fukui .................... H01M 4/134 429/217 |
| 2013/0260241 A1 | 10/2013 | Sone et al. |
| 2016/0204465 A1 | 7/2016 | Mimura et al. |
| 2017/0288144 A1 | 10/2017 | Makino et al. |
| 2017/0301950 A1 | 10/2017 | Mimura et al. |

FOREIGN PATENT DOCUMENTS

| | | |
|---|---|---|
| JP | 2005-44794 A | 2/2005 |
| JP | 2010-262764 A | 11/2010 |
| KR | 10-2013-0020938 A | 3/2013 |
| WO | 2012/173089 A1 | 12/2012 |
| WO | 2015/046314 A1 | 4/2015 |
| WO | 2016/125716 A1 | 8/2016 |
| WO | 2016/129427 A1 | 8/2016 |

OTHER PUBLICATIONS

International Preliminary Report on Patentability with the translation of Written Opinion dated Jul. 31, 2018 issued by the International Bureau in PCT/JP2017/002754.
International Search Report of PCT/JP2017/002754 dated Mar. 14, 2017.
Communication dated Sep. 11, 2019, issued by the Korean Intellectual Property Office in corresponding application No. 10-2018-7022414.
Communication dated Mar. 10, 2020 from the Korean Intellectual Property Office in Application No. 10-2018-7022414.
Communication dated Aug. 20, 2020 from the State Intellectual Property Office of the P.R.C. in Application No. 201780007914.2.

* cited by examiner

SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, AND METHODS FOR MANUFACTURING SHEET FOR ALL-SOLID STATE SECONDARY BATTERY, ELECTRODE SHEET FOR ALL-SOLID STATE SECONDARY BATTERY, AND ALL-SOLID STATE SECONDARY BATTERY

CROSS-REFERENCE TO RELATED APPLICATIONS

This application is a Continuation of PCT International Application No. PCT/JP2017/002754 filed on Jan. 26, 2017, which claims priority under 35 U.S.C. § 119 (a) to Japanese Patent Application No. 2016-013762 filed in Japan on Jan. 27, 2016. Each of the above applications is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an electrode sheet for an all-solid state secondary battery, and an all-solid state secondary battery, and methods for manufacturing a sheet for an all-solid state secondary battery, an electrode sheet for an all-solid state secondary battery, and an all-solid state secondary battery.

2. Description of the Related Art

Lithium ion secondary batteries are storage batteries which have a negative electrode, a positive electrode, and an electrolyte sandwiched between the negative electrode and the positive electrode and which can be discharged and charged by lithium ions reciprocally migrating between both electrodes. In the related art, in lithium ion secondary batteries, organic electrolytic solutions have been used as electrolytes. However, organic electrolytic solutions are likely to cause liquid leakage, additionally, there is a concern that overcharging or over-discharging may cause short circuits and ignition in batteries, and there is a demand for further improving reliability and safety.

In such a circumstance, all-solid state secondary batteries in which an inorganic solid electrolyte is used instead of an organic electrolytic solution are attracting attention. In all-solid state secondary batteries, all of the negative electrode, the electrolyte, and the positive electrode are made of a solid, safety or reliability which is a problem of batteries in which an organic electrolytic solution is used can be significantly improved, and it becomes possible to extend the service lives of batteries. Furthermore, to all-solid state secondary batteries, it is possible to provide a structure in which electrodes and an electrolyte are disposed in series in a direct arrangement. Therefore, compared with secondary batteries in which an organic electrolytic solution is used, it becomes possible to increase the energy density, and the application to electric vehicles, large-sized storage batteries, and the like is expected.

In the above-described all-solid state secondary batteries, the formation of any of the active material layer of the negative electrode, the solid electrolyte layer, and the active material layer of the positive electrode using a material containing an inorganic solid electrolyte or an active material and the binder particles (binding agent) of a specific polymer compound or the like is proposed. For example, JP2010-262764A describes a slurry for forming a positive electrode mixture layer in which a styrene-containing binder resin is used as a binding agent. In addition, WO2012/173089A describes the addition of a combination of a binding agent made of a specific particulate polymer and an inorganic solid electrolyte to an active material layer or the like.

SUMMARY OF THE INVENTION

In recent years, rapid development has been underway for all-solid state secondary batteries, and performance required for all-solid state secondary batteries has also enhanced. Particularly, in all-solid state secondary batteries in which electrode active material layers and a solid electrolyte layer are formed of solid particles, there is a demand for decreasing the interface resistance between the solid particles and enhancing the bonding property thereof in order to improve battery performance such as ion conductivity.

An object of the present invention is to provide a solid electrolyte composition which is used in an all-solid state secondary battery, improves a bonding property between solid particles or the like, which enables a decrease in interface resistance and the improvement of cycle characteristics, and has an excellent dispersibility. In addition, an object of the present invention is to provide a sheet for an all-solid state secondary battery, an electrode sheet for an all-solid state secondary battery, and an all-solid state secondary battery in which the solid electrolyte composition is used. Furthermore, an object of the present invention is to provide methods for manufacturing the sheet for an all-solid state secondary battery, the electrode sheet for an all-solid state secondary battery, and the all-solid state secondary battery.

As a result of repetitive studies, the present inventors found that a solid electrolyte composition in which a polymer including a constituent component derived from a macromonomer having a mass-average molecular weight in a specific range and having a group including a ring structure of two or more rings is used as a binder has an excellent dispersibility. Furthermore, it was found that, in a case in which the solid electrolyte composition is used to form individual layers of an all-solid state secondary battery, it is possible to enhance the bonding property (adhesiveness) between solid particles in the formed layers and decrease the interface resistance of the solid particles, and all-solid state secondary batteries to be obtained have excellent cycle characteristics. The present invention has been completed by further repeating studies on the basis of the above-described finding.

That is, the above-described objects were achieved using the following means.

<1> A solid electrolyte composition comprising: an inorganic solid electrolyte having conductivity for ions of metals belonging to Group I or II of the periodic table; and a binder, in which a polymer constituting the binder includes a constituent component derived from a macromonomer having a mass-average molecular weight of 1,000 or more and less than 1,000,000 and includes a ring structure of two or more rings.

<2> The solid electrolyte composition according to <1>, in which the polymer constituting the binder includes a repeating unit having a group including a ring structure of two or more rings in a side chain.

<3> The solid electrolyte composition according to <2>, in which the repeating unit having a group including a ring structure of two or more rings is incorporated into the constituent component derived from a macromonomer.

<4> The solid electrolyte composition according to <2> or <3>, in which a content of the repeating unit having a group including a ring structure of two or more rings is 10% by mass or more and 85% by mass or less with respect to 100% by mass of the polymer constituting the binder.

<5> The solid electrolyte composition according to any one of <1> to <4>, in which the polymer constituting the binder has a particle shape and has an average particle diameter of 10 nm or more and 50,000 nm or less.

<6> The solid electrolyte composition according to any one of <1> to <5>, in which the group including a ring structure of two or more rings has a structure in which at least one hydrogen atom of a compound represented by General Formula (D) is substituted with a bonding site, General Formula (D)

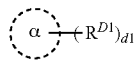

in General Formula (D), a ring α represents a ring of two or more rings, $R^{D1}$ represents a substituent that bonds to a constituent atom of the ring α, and d1 represents an integer of 1 or more; in a case in which d1 is 2 or more, a plurality of $R^{D1}$'s may be identical to or different from each other, and $R^{D1}$'s substituting adjacent atoms may bond together and thus form a ring.

<7> The solid electrolyte composition according to any one of <1> to <6>, in which the inorganic solid electrolyte is represented by Formula (1), $$L_{a1}M_{b1}P_{c1}S_{d1}A_{e1} \quad (1)$$

in the formula, L represents an element selected from Li, Na, and K. M represents an element selected from B, Zn, Sn, Si, Cu, Ga, Sb, Al, and Ge. A represents I, Br, Cl, or F. a1 to e1 represent the compositional ratios among the respective elements, and a1:b1:c1:d1:e1 satisfies 1 to 12:0 to 5:1:2 to 12:0 to 10.

<8> The solid electrolyte composition according to <6>, in which the structure in which at least one hydrogen atom of the compound represented by General Formula (D) is substituted with a bonding site is a structure in which at least one hydrogen atom of a compound represented by General Formula (1) or an aliphatic hydrocarbon represented by General Formula (2) is substituted with a bonding site, General Formula (1)

in General Formula (1), CHC represents a benzene ring, a cyclohexane ring, a cyclohexene ring, or a cyclohexadiene ring, n1 represents an integer of 0 to 8, $R^{11}$ to $R^{16}$ each independently represent a hydrogen atom or a substituent, $X^1$ and $X^2$ each independently represents a hydrogen atom or a substituent; here, in $R^{11}$ to $R^{16}$, $X^1$, and $X^2$, mutually adjacent groups may bond to each other and thus form a 5 or 6-membered ring; however, in a case in which n1 is 0, any one substituent of $R^{11}$ to $R^{16}$ is —$(CHC^1)_{m1}$—Rx or any two of $R^{11}$ to $R^{16}$ bond together and thus form —$(CHC^1)_{m1}$—; here, $CHC^1$ represents a phenylene group, a cycloalkylene group, or a cycloalkenylene group, m1 represents an integer of 2 or more, Rx represents a hydrogen atom or a substituent, in addition, in a case in which n1 is 1, in $R^{11}$ to $R^{16}$, $X^1$, and $X^2$, at least two atoms or substituents that are adjacent to each other bond together and thus form a benzene ring, a cyclohexane ring, a cyclohexene ring, or a cyclohexadiene ring, General Formula (2)

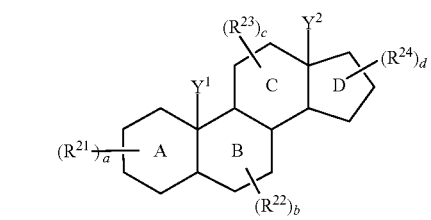

in General Formula (2), $Y^1$ and $Y^2$ each independently represents a hydrogen atom, a methyl group, or a formyl group, $R^{21}$, $R^{22}$, $R^{23}$, and $R^{24}$ each independently represent a substituent, and a, b, c, and d each independently represents an integer of 0 to 4, here, an A ring may be a saturated ring or an unsaturated ring having one or two double bonds or an aromatic ring, a B ring and a C ring may be an unsaturated ring having one or two double bonds; meanwhile, in a case in which a, b, c, and d are an integer of 2 to 4, adjacent $R^{21}$'s, $R^{22}$'s, $R^{23}$'s, and/or $R^{24}$'s may bond together and thus form a ring.

<9> The solid electrolyte composition according to any one of <1> to <8>, in which the polymer constituting the binder is a polyamide, a polyimide, a polyurea, a polyurethane, or an acrylic resin.

<10> The solid electrolyte composition according to any one of <1> to <9>, in which the polymer constituting the binder includes at least one constituent component selected from a (meth)acrylic acid component, a (meth)acrylic acid ester component, and a (meth)acrylonitrile component.

<11> The solid electrolyte composition according to any one of <1> to <10>, further comprising: an active material capable of intercalating and deintercalating ions of metals belonging to Group I or Group II of the periodic table.

<12> The solid electrolyte composition according to <11>, in which the active material is a carbonaceous material.

<13> A sheet for an all-solid state secondary battery, comprising: a film of the solid electrolyte composition according to any one of <1> or <10> on a base material.

<14> An electrode sheet for an all-solid state secondary battery, comprising: a film of the solid electrolyte composition according to <11> or <12> on a base material.

<15> An all-solid state secondary battery comprising: a positive electrode active material layer; a negative electrode active material layer; and a solid electrolyte layer, in which at least one of the positive electrode active material layer, the negative electrode active material layer, and the solid electrolyte layer is a layer constituted of the solid electrolyte composition according to any one of <1> to <12>.

<16> A method for manufacturing a sheet for an all-solid state secondary battery, comprising: disposing the solid electrolyte composition according to any one of <1> to <10> on a base material; and forming a film of the solid electrolyte composition.

<17> A method for manufacturing an electrode sheet for an all-solid state secondary battery, comprising: disposing the solid electrolyte composition according to <11> or <12> on a base material; and forming a film of the solid electrolyte composition.

<18> A method for manufacturing an all-solid state secondary battery, comprising: manufacturing an all-solid state secondary battery using the manufacturing method according to <16> or <17>.

In the present specification, numerical ranges expressed using "to" include numerical values before and after "to" as the lower limit value and the upper limit value.

In the present specification, in the case of being simply expressed, "acryl" or "(meth)acryl" refers to methacryl or acryl. In addition, in the case of being simply expressed, "acrylonitrile" or "(meth)acrylonitrile" refers to methacrylonitrile or acrylonitrile.

The solid electrolyte composition of the present invention has a favorable dispersibility and, when this solid electrolyte composition is used to form layers of an all-solid state secondary battery, it is possible to decrease the interface resistance by enhancing the bonding property between solid particles in the formed layers, and it is possible to enhance the cycle characteristics of the all-solid state secondary battery. In addition, the sheet for an all-solid state secondary battery and the electrode sheet for an all-solid state secondary battery of the present invention are excellent in terms of the bonding property between solid particles and the like. In addition, the all-solid state secondary battery of the present invention has a low resistance and is also excellent in terms of the cycle characteristics.

In addition, according to the method for manufacturing a sheet for an all-solid state secondary battery, the method for manufacturing an electrode sheet for an all-solid state secondary battery, and the method for manufacturing an all-solid state secondary battery of the present invention, it is possible to manufacture sheets for an all-solid state secondary battery, electrode sheets for an all-solid state secondary battery, and all-solid state secondary batteries which exhibit the above-described excellent effect.

The above-described characteristics and advantages and other characteristics and advantages of the present invention will be further clarified from the following description with reference to the appropriately accompanied drawings.

DESCRIPTION OF THE PREFERRED EMBODIMENTS

A solid electrolyte composition of the present invention has a polymer including a constituent component derived from a macromonomer having a mass-average molecular weight of 1,000 or more and less than 1,000,000 and having a group including a ring structure of two or more rings as a binder and further includes a specific inorganic solid electrolyte. Here, the binder preferably has a particle shape, that is, the binder is preferably binder particles. Hereinafter, in the description of a preferred embodiment of the present invention, an aspect in which the binder has a particle shape will be described, but the present invention is not limited to the aspect in which the binder has a particle shape.

[All-Solid State Secondary Battery]

An all-solid state secondary battery of the present invention has a positive electrode, a negative electrode facing this positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer, the positive electrode active material layer, and the solid electrolyte layer is preferably formed of the solid electrolyte composition of the present invention described below, and particularly, all of the layers are more preferably formed of the solid electrolyte composition of the present invention.

The kinds of the components and the content ratio therebetween of the active material layers or the solid electrolyte layer formed of the solid electrolyte composition are preferably the same as those in the solid content of the solid electrolyte composition.

Hereinafter, a preferred embodiment of the present invention will be described, but the present invention is not limited thereto.

Figure 1:
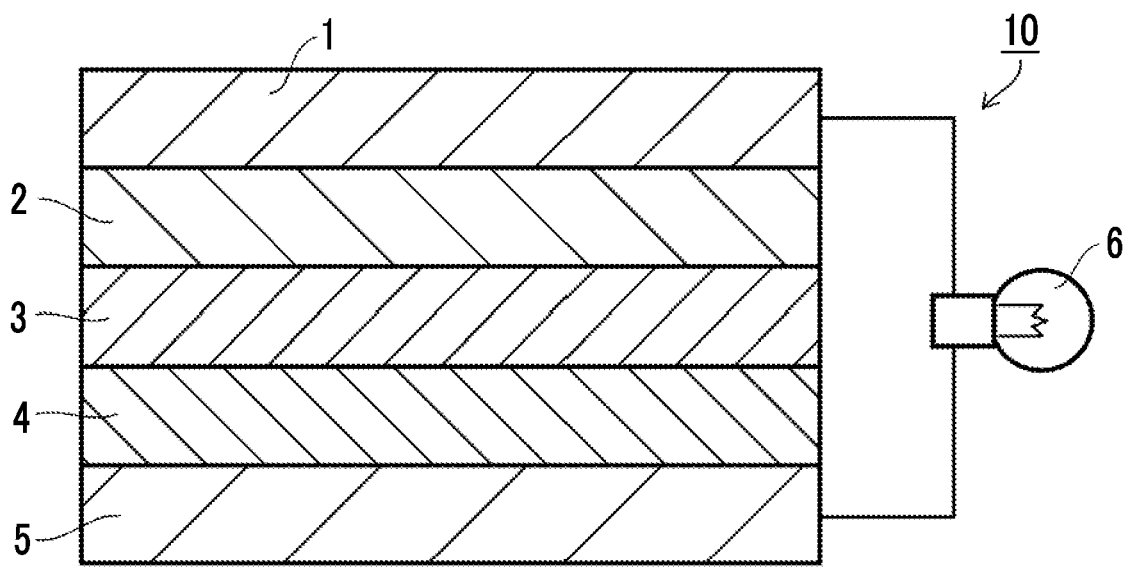
FIG. 1 is a vertical cross-sectional view schematically illustrating an all-solid state secondary battery according to a preferred embodiment of the present invention.
Figure 2:
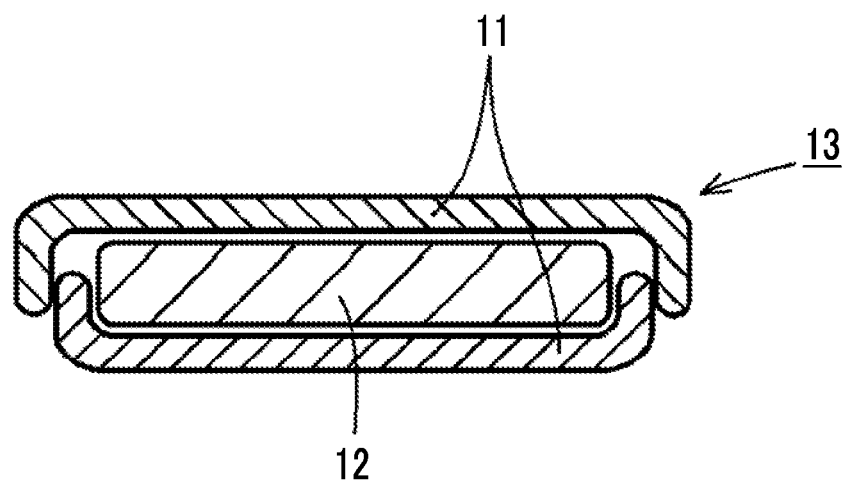
FIG. 2 is a vertical cross-sectional view schematically illustrating an all-solid state secondary battery (coin battery) produced in an example.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment has a structure in which a negative electrode collector 1, a negative electrode active material layer 2, a solid electrolyte layer 3, a positive electrode active material layer 4, and a positive electrode collector 5 are laminated in this order, and adjacent layers are in direct contact with each other. In a case in which the above-described structure is employed, during charging, electrons (e$^-$) are supplied to the negative electrode side, and lithium ions (Li$^+$) are accumulated thereon. On the other hand, during discharging, the lithium ions (Li$^+$) accumulated on the negative electrode return to the positive electrode side, and it is possible to supply electrons to an operation portion 6. In the example of the all-solid state secondary battery illustrated in the drawing, an electric bulb is employed as a model of the operation portion 6 and is lit by discharging.

[Positive Electrode Active Material Layer, Solid Electrolyte Layer, and Negative Electrode Active Material Layer]

In the all-solid state secondary battery 10, all of the positive electrode active material layer, the solid electrolyte layer, and the negative electrode active material layer are formed of the solid electrolyte composition of the present invention.

That is, the solid electrolyte layer 3 includes an inorganic solid electrolyte having conductivity for ions of metals belonging to Group I or II of the periodic table and binder particles which include a constituent component derived from a macromonomer having a mass-average molecular weight of 1,000 or more and less than 1,000,000 as a side chain component and are made of a polymer having a group including a ring structure of two or more rings.

Hereinafter, there will be a case in which the inorganic solid electrolyte having conductivity for ions of metals belonging to Group I or II of the periodic table is simply referred to as an inorganic solid electrolyte. In addition, there will be a case in which the binder particles which include a constituent component derived from a macromonomer having a mass-average molecular weight of 1,000 or more and less than 1,000,000 as a side chain component and are made of a polymer having a group including a ring structure of two or more rings is simply referred to as binder particles.

The solid electrolyte layer generally does not include a positive electrode active material and/or a negative electrode active material. In the solid electrolyte layer 3, the binder particles are present between solid particles of the inorganic solid electrolyte, the active materials that are included in the adjacent active material layers, and the like and thus it is possible to enhance the bonding property and decrease the interface resistance between the solid particles.

The positive electrode active material layer 4 and the negative electrode active material layer 2 respectively include a positive electrode active material and a negative electrode active material and further include an inorganic solid electrolyte and binder particles. In a case in which the active material layer contains the inorganic solid electrolyte, it is possible to improve the ion conductivity. In the active material layer, the binder particles are present between solid particles and the like, and thus the bonding property is enhanced, and it is possible to decrease the interface resistance.

The kinds of the inorganic solid electrolytes and the binder particles that the positive electrode active material layer 4, the solid electrolyte layer 3, and the negative electrode active material layer 2 contain may be identical to or different from each other.

In the present invention, there are cases in which any or both of the positive electrode active material layer and the negative electrode active material layer will be simply referred to as the active material layer or the electrode active material layer. In addition, there are cases in which any or both of the positive electrode active material and the negative electrode active material will be simply referred to as the active material or the electrode active material.

In the present invention, in a case in which the above-described binder particles are used (contained) in combination of the solid particles of the inorganic solid electrolyte, the active material, or the like, it is possible to decrease the interface resistance between the solid particles and the like, and furthermore, a favorable bonding property can also be realized.

The action and mechanism thereof are not clear but are considered as follows. That is, in a case in which the solid particles and the binder particles are made to coexist, the interface contact area between the binder particles and the solid particles becomes small, and an increase in the interface resistance between the solid particles is suppressed. Furthermore, since a macromonomer having a mass-average molecular weight of 1,000 or more and less than 1,000,000 is used as a synthesis raw material for the polymer constituting the binder particles, the binder particles sterically repulse one another, and thus the dispersibility of the solid electrolyte composition improves. Furthermore, the binder particles have a group including a ring structure of two or more rings, and thus, in the all-solid state secondary battery, the binder particles interact with the solid particles, and thus it is possible to suppress the peeling of the solid particles from the collectors or the misfit between the solid particles by maintaining the bonding property between the solid particles and the like. It is considered that, due to the combination of the above-described actions, excellent battery characteristics such as an ion conductivity are exhibited.

In the present invention in which the binder particles holding a favorable bonding property with the solid particles and the like are used, in addition to the above-described excellent battery characteristics, it is possible to extend the battery service life by sufficiently maintaining the contact state between the active materials and the solid electrolyte through the contraction and expansion of the active materials caused by the emission and absorption of the ions of metal elements belonging to Group I or II of the periodic table (the charging and discharging of the all-solid state secondary battery) (the cycle characteristics are excellent).

The mechanism of the binder particles bonding to the solid particles, the active materials, or the collectors is not clear, but is assumed to be attributed to the interaction between a polymer forming the binder particles and the solid particles and the like. Absorption (including chemical absorption and physical absorption), chemical reactions, and the like can be considered as the above-described interaction.

The thicknesses of the positive electrode active material layer 4, the solid electrolyte layer 3, and the negative electrode active material layer 2 are not particularly limited. In a case in which the dimensions of ordinary batteries are taken into account, the thicknesses of the respective layers are preferably 10 to 1,000 μm and more preferably 20 μm or more and less than 500 μm. In the all-solid state secondary battery of the present invention, the thickness of at least one layer of the positive electrode active material layer 4, the solid electrolyte layer 3, or the negative electrode active material layer 2 is still more preferably 50 μm or more and less than 500 μm.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum, an aluminum alloy, or stainless steel is more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of porous bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be constituted of a single layer or multiple layers.

[Chassis]

The basic structure of the all-solid state secondary battery can be produced by disposing the respective layers described above. Depending on the use, the basic structure alone may be used as an all-solid state secondary battery, but the basic structure may be used in a state of being further enclosed by an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode chassis and a negative electrode chassis and electrically connected to the positive electrode collector and the negative electrode collector respectively. The positive electrode chassis and the negative electrode chassis are preferably integrated by being joined together through a short circuit prevention gasket.

[Solid Electrolyte Composition]

The solid electrolyte composition of the present invention is as described above and will be specifically described below.

(Inorganic Solid Electrolyte)

The solid electrolyte composition of the present invention contains an inorganic solid electrolyte having conductivity for ions of metals belonging to Group I or II of the periodic table.

A solid electrolyte of the inorganic solid electrolyte refers to a solid-form electrolyte capable of migrating ions therein. The solid electrolyte is clearly differentiated from organic solid electrolytes (polymer electrolytes represented by polyethylene oxide (PEO) or the like and organic electrolyte salts represented by lithium bis(trifluoromethanesulfonyl) imide (LiTFSI)) since the solid electrolyte does not include any organic substances as a principal ion-conductive material. In addition, the inorganic solid electrolyte is a solid in a static state and is thus not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, lithium bis(fluorosulfonyl) imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity. In a case in which the all-solid state secondary battery of the present invention is a lithium ion battery, the inorganic solid electrolyte preferably has ion conductivity for lithium ions.

As the inorganic solid electrolyte, it is possible to appropriately select and use solid electrolyte materials that are generally used in all-solid state secondary batteries. Typical examples of the inorganic solid electrolyte include (i) sulfide-based inorganic solid electrolytes and (ii) oxide-based inorganic solid electrolytes. In the present invention, a sulfide-based inorganic solid electrolyte is preferably used since it is possible to form a more favorable interface between the active material and the inorganic solid electrolyte.

(i) Sulfide-Based Inorganic Solid Electrolytes

Sulfide-based inorganic solid electrolytes are preferably inorganic solid electrolytes which contain sulfur (S), have ion conductivity for metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases. Examples thereof include lithium ion-conductive inorganic solid electrolytes satisfying a composition represented by Formula (1).

(In the formula, L represents an element selected from Li, Na, and K and is preferably Li. M represents an element selected from B, Zn, Sn, Si, Cu, Ga, Sb, Al, and Ge. A represents I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.)

The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials among, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, halogenated lithium (for example, LiI, LiBr, and LiCl) and sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S$:$P_2S_5$. In a case in which the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ or less.

As specific examples of the sulfide solid electrolyte, combination examples of raw materials will be described below. Specific examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Here, the respective raw materials may be mixed together at any ratios. Examples of a method for synthesizing sulfide solid electrolyte materials using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably solid electrolytes which contain oxygen atoms (O), have an ion conductivity for metal elements belonging to Group I or II of the periodic table, and have electron-insulating properties.

The ion conductivity for the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit is not particularly limited, but is realistically $1 \times 10^{-1}$ S/cm or less.

Specific examples of the compounds include $Li_{xa}La_{ya}TiO_3$ [xa satisfies $0.3 \leq xa \leq 0.7$ and ya satisfies $0.3 \leq ya \leq 0.7$.] (LLT); $Li_{xb}La_{yb}Zr_{zb}M^{bb}_{mb}O_{nb}$ ($M^{bb}$ is at least one element selected from Al, Mg, Ca, Sr, V, Nb, Ta, Ti, Ge, In and Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ is at least one element selected from C, S, Al, Si, Ga, Ge, In, and Sn, xc satisfies $0 \leq xc \leq 5$, yc satisfies $0 \leq yc \leq 1$, zc satisfies $0 \leq zc \leq 1$, and nc satisfies $0 \leq nc \leq 6$); $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$), $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0 \leq xh \leq 1$ and yh satisfies $0 \leq yh \leq 1$); $Li_7La_3Zr_2O_{12}$ (LLZ) having a garnet-type crystal structure.

In addition, phosphorus compounds containing Li, P, and O are also desirable. Examples thereof include lithium phosphate ($Li_3PO_4$); LiPON in which some of oxygen atoms in lithium phosphate are substituted with nitrogen, $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au); and the like.

Furthermore, it is also possible to preferably use $LiA^1ON$ ($A^1$ is one or more elements selected from Si, B, Ge, Al, C, and Ga) and the like.

Among these, LLT, $Li_{xb}La_{yb}Zr_{zb}M^{bb}_{mb}O_{nb}$ ($M^{bb}$, xb, yb, zb, mb, and nb are as described above), LLZ, $Li_3BO_3$; $Li_3BO_3$—$Li_2SO_4$, and $Li_{xd}(Al, Ga)_{yd}(Ti, Ge)_{zd}Si_{ad}P_{md}O_{nd}$ (xd, yd, zd, ad, md, and nd are as described above) are preferred, and LLZ, LLT, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$) are more preferred.

The inorganic solid electrolyte is preferably particles. The volume-average particle diameter of the particulate inorganic solid electrolyte is not particularly limited, but is preferably 0.01 μm or more and more preferably 0.1 μm or more. The upper limit is preferably 100 μm or less and more preferably 50 μm or less. Meanwhile, the volume-average particle diameter of the inorganic solid electrolyte is measured in the following order. One percent by mass of a dispersion liquid is diluted and prepared using the inorganic solid electrolyte particles and water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced per level, and the average values thereof are employed.

In a case in which the satisfaction of both the battery performance and the interface resistance-reducing and maintaining effect is taken into account, the content of the inorganic solid electrolyte in the solid electrolyte composition is preferably 5% by mass or more, more preferably 70% by mass or more, and particularly preferably 90% by mass or more with respect to 100%/o by mass of the solid content. From the same viewpoint, the upper limit is preferably 99.9% by mass or less, more preferably 99.5% by mass or less, and particularly preferably 99% by mass or less.

Here, in a case in which the solid electrolyte composition contains the positive electrode active material or the negative electrode active material, regarding the content of the inorganic solid electrolyte in the solid electrolyte composition, the total content of the positive electrode active material or the negative electrode active material and the inorganic solid electrolyte is preferably in the above-described range.

Meanwhile, the solid content in the present specification refers to a component that does not disappear due to volatilization or evaporation in the case of being dried at 170° C. for six hours in a nitrogen atmosphere. Typically, the solid content indicates components other than a dispersion medium described below.

These inorganic solid electrolytes may be used singly or two or more inorganic solid electrolytes may be used in combination.

(Binder Particles)

The solid electrolyte composition of the present invention contains binder particles which include a constituent component derived from a macromonomer having a mass-average molecular weight of 1,000 or more and less than 1,000,000 and have a group including a ring structure of two or more rings.

The polymer constituting the binder particles is preferably a polyamide, a polyimide, a polyurea, a polyurethane, or an acrylic resin.

Main Chain

The main chain of the polymer constituting the binder particles of the present invention is not particularly limited.

A monomer that is used as a synthesis raw material constituting the main chain of the polymer is preferably a monomer having a polymerizable unsaturated bond. For example, it is possible to apply a variety of vinyl-based monomers and/or acrylic monomers. In the present invention, among them, acrylic monomers are preferably used. Monomers selected from (meth)acrylic acid monomers, (meth)acrylic acid ester monomers, and (meth)acrylonitrile are more preferably used. The number of polymerizable groups (polymerizable portions) is not particularly limited, but preferably 1 to 4.

The polymer constituting the binder particles that are used in the present invention preferably has at least one of the following group of functional groups (a). This group of functional groups may be included in the main chain or may be included in a macromonomer-derived graft chain described below. In a case in which a specific functional group is included in the polymer as described above, the interaction with a hydrogen atom, an oxygen atom, and a sulfur atom that are considered to be present on the surfaces of the inorganic solid electrolyte, the active materials, and the collectors becomes strong, the bonding property improves, and an action of decreasing the resistance of the interface can be expected.

Group of Functional Groups (a)

A carbonyl-containing group, an amino group, a sulfonic acid group, a phosphoric acid group, a hydroxy group, an ether group (—O—), a cyano group, and a mercapto group Examples of the carbonyl-containing group include a carboxy group, a carbonyloxy group, an oxycarbonyl group, an amide group, a carbamoyl group, and the like, and the number of carbon atoms is preferably 1 to 24, more preferably 1 to 12, and particularly preferably 1 to 6.

In the amino group, the number of carbon atoms is preferably 0 to 12, more preferably 0 to 6, and particularly preferably 0 to 2.

The sulfonic acid group may be an ester or salt thereof. In the case of an ester, the number of carbon atoms is preferably 1 to 24, more preferably 1 to 12, and particularly preferably 1 to 6.

The phosphoric acid group may be an ester or salt thereof. In the case of an ester, the number of carbon atoms is preferably 1 to 24, more preferably 1 to 12, and particularly preferably 1 to 6.

Meanwhile, the above-described functional group may be present as a substituent or may be present as a linking group. For example, the amino group may be present as a divalent imino group or a trivalent nitrogen atom.

The vinyl-based monomer that can be used for the synthesis of the polymer is preferably a monomer represented by Formula (b-1).

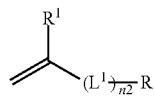

(b-1)

In the formula, $R^1$ represents a hydrogen atom, a hydroxy group, a cyano group, a halogen atom, an alkyl group (preferably having 1 to 24 carbon atoms, more preferably having 1 to 12 carbon atoms, and particularly preferably having 1 to 6 carbon atoms), an alkenyl group (preferably having 2 to 24 carbon atoms, more preferably having 2 to 12 carbon atoms, and particularly preferably having 2 to 6 carbon atoms), an alkynyl group (preferably having 2 to 24 carbon atoms, more preferably having 2 to 12 carbon atoms, and particularly preferably having 2 to 6 carbon atoms), or an aryl group (preferably having 6 to 22 carbon atoms and more preferably having 6 to 14 carbon atoms). Among them, a hydrogen atom or an alkyl group is preferred, and a hydrogen atom or a methyl group is more preferred.

R is a hydrogen atom, an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), an aralkyl group (preferably having 7 to 23 carbon atoms and more preferably having 7 to 15 carbon atoms), a cyano group, a carboxy group, a hydroxy group, a mercapto group, a sulfonic acid group, a phosphoric acid group, a phosphonic acid group, an aliphatic heterocyclic group-containing group containing an oxygen atom (preferably having 2 to 12 carbon atoms and more preferably having 2 to 6 carbon atoms), or an amino group ($NR^N{}_2$: $R^N$ is, according to a definition described below, preferably a hydrogen atom or an alkyl group having 1 to 3 carbon atoms). Among these, a methyl group, an ethyl group, a propyl group, a butyl group, a cyano group, an ethenyl group, a phenyl group, a carboxy group, a mercapto group, a sulfonic acid group, and the like are preferred.

R may further have a substituent T described below. Among them, a carboxy group, a halogen atom (a fluorine atom or the like), a hydroxy group, an alkyl group, or the like may be substituted.

A carboxy group, a hydroxy group, a sulfonic acid group, a phosphoric acid group, and a phosphonic acid group may be esterified by accompanying, for example, an alkyl group having 1 to 6 carbon atoms.

The aliphatic heterocyclic group-containing group containing an oxygen atom is preferably an epoxy group, an epoxy group-containing group, an oxetanyl group-containing group, a tetrahydrofuryl group-containing group, or the like.

$L^1$ is a random linking group, and examples thereof include a linking group L described below. Specific examples thereof include an alkylene group having 1 to 6 carbon atoms (preferably having 1 to 3 carbon atoms), an alkenylene group having 2 to 6 carbon atoms (preferably having 2 or 3 carbon atoms), an arylene group having 6 to 24 carbon atoms (preferably having 6 to 10 carbon atoms), an oxygen atom, a sulfur atom, an imino group ($NR^N$), a carbonyl group, a phosphoric acid linking group (—O—P(OH)(O)—O—), a phosphonic acid linking group (—P(OH)(O)—O—), groups according to a combination thereof, and the like. The linking group may have a random substituent. The number of linking atoms, and a preferred range of the number of linking atoms are identical to those described below. Examples of the random substituent include the substituent T described below, and examples thereof include an alkyl group, a halogen atom, and the like.

n2 is 0 or 1.

The acrylic monomer that can be used for the synthesis of the polymer is preferably a monomer represented by any of Formulae (b-2) to (b-6).

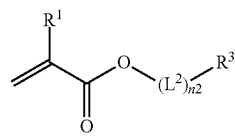

(b-2)

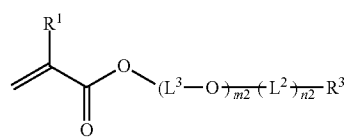

(b-3)

-continued

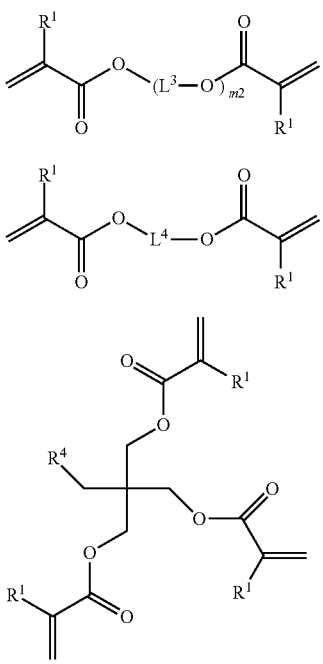

(b-4)

(b-5)

(b-6)

R¹ and n2 are identical to those in Formula (b-1).

R³ is identical to R. However, preferred examples thereof include a hydrogen atom, an alkyl group, an aryl group, a carboxy group, a mercapto group, a phosphoric acid group, a phosphonic acid group, an aliphatic heterocyclic group containing an oxygen atom, an amino group ($NR^N{}_2$), and the like.

$L^2$ is a random linking group, the examples of $L^1$ are preferred, and an oxygen atom, an alkylene group having 1 to 6 carbon atoms (preferably having 1 to 3 carbon atoms), an alkenylene group having 2 to 6 carbon atoms (preferably having 2 or 3 carbon atoms), a carbonyl group, an imino group ($NR^N$), groups according to a combination thereof, and the like are more preferred.

$L^3$ is a linking group, the examples of $L^2$ are preferred, and an alkylene group having 1 to 6 carbon atoms (preferably having 1 to 3 carbon atoms) is more preferred.

$L^4$ is identical to $L^1$.

$R^4$ is a hydrogen atom, an alkyl group having 1 to 6 carbon atoms (preferably having 1 to 3 carbon atoms), a hydroxy group-containing group having 0 to 6 carbon atoms (preferably having 0 to 3 carbon atoms), a carboxy group-containing group having 1 to 6 carbon atoms (preferably having 1 to 3 carbon atoms), or a (meth)acryloyloxy group. Meanwhile, $R^4$ may serve as the linking group as $L^1$ and constitute a dimer in this portion.

m2 represents an integer of 1 to 200, preferably an integer of 1 to 100, and more preferably an integer of 1 to 50.

In Formulae (b-1) to (b-6), the groups that, in some cases, have a substituent such as an alkyl group, an aryl group, an alkylene group, or an arylene group may have a random substituent as long as the effects of the present invention are maintained. Examples of the random substituent include the substituent T, and, specifically, the groups may have a random substituent such as a halogen atom, a hydroxy group, a carboxy group, a mercapto group, an acyl group, an acyloxy group, an alkoxy group, an aryloxy group, or an amino group.

Hereinafter, examples of the monomers that can be used as a synthesis raw material of the polymer constituting the binder particles will be illustrated, but the present invention is not interpreted to be limited by them. 1 in the following formulae represents 1 to 1,000,000.

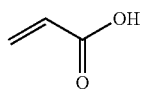

A-1

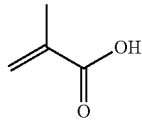

A-2

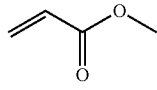

A-3

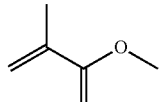

A-4

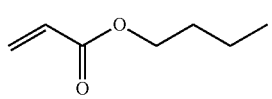

A-5

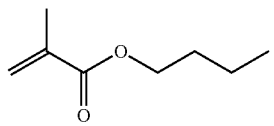

A-6

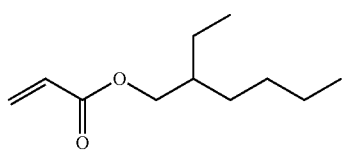

A-7

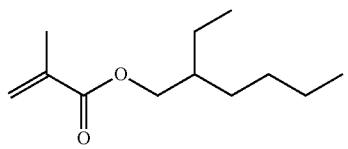

A-8

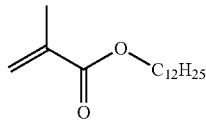

A-9

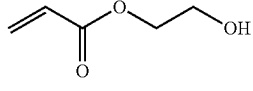

A-10

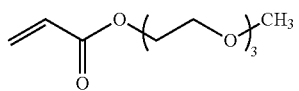

A-11

-continued
A-12
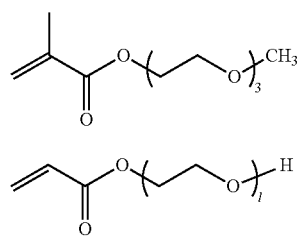
A-13
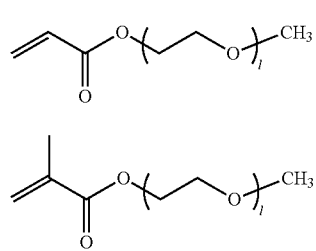
A-14
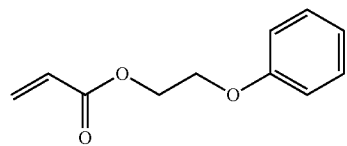
A-15
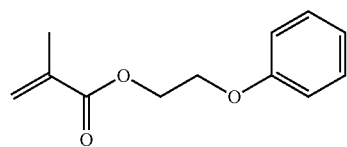
A-16
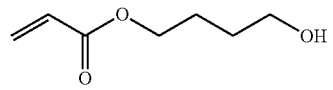
A-17
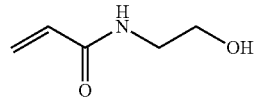
A-18
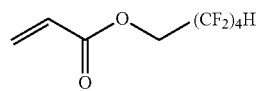
A-19
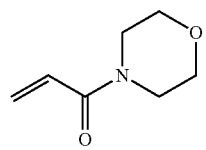
A-20
A-21
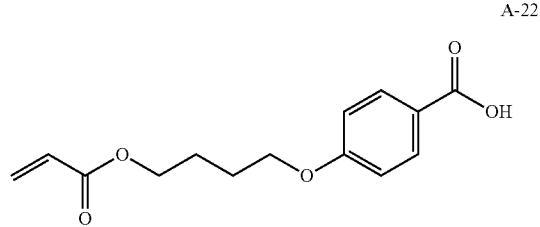
A-22
-continued
A-23
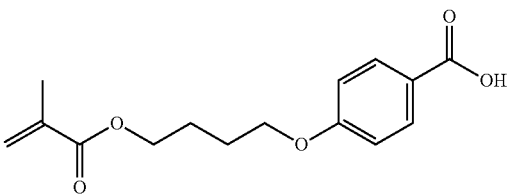
A-24
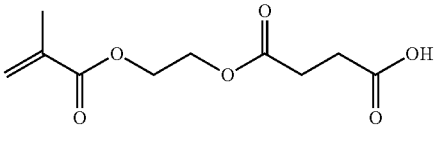
A-25
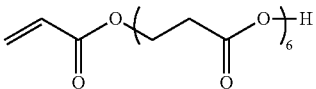
A-26
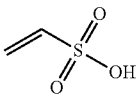
A-27
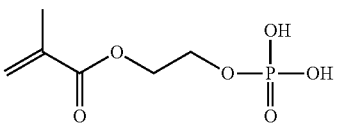
A-28
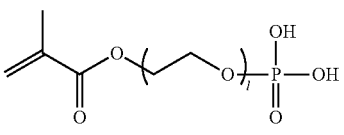
A-29
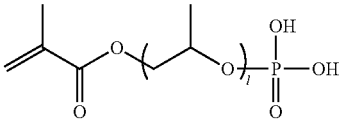
A-30
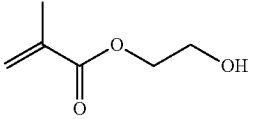
A-31
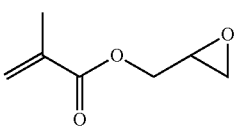
A-32
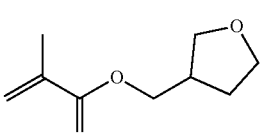
A-33
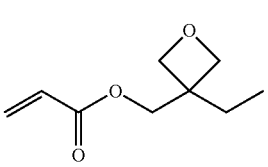

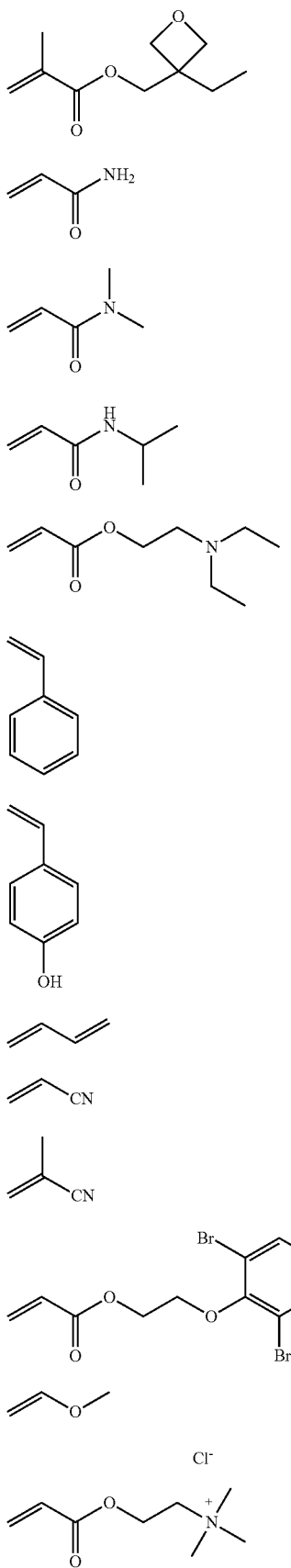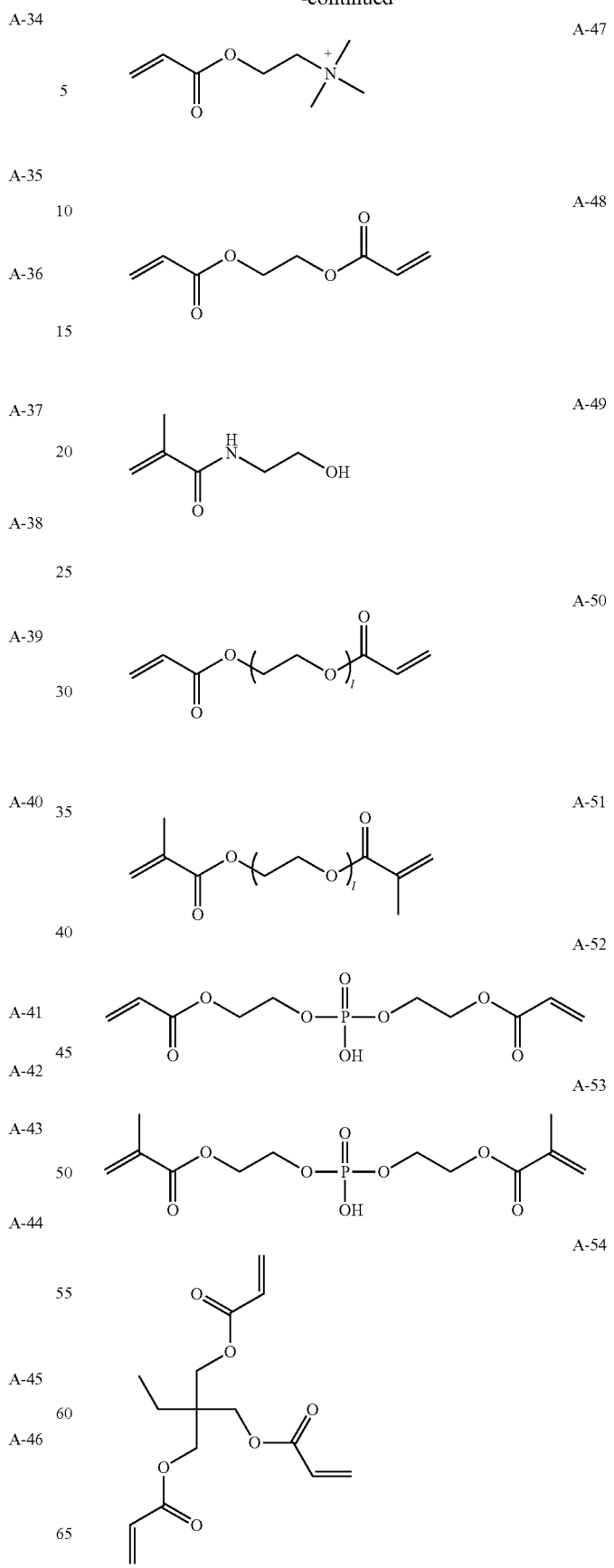

A-55 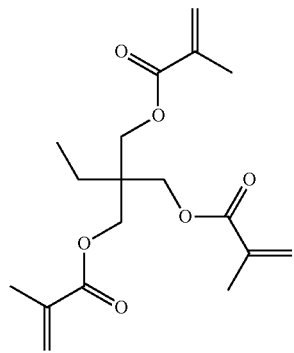
A-56 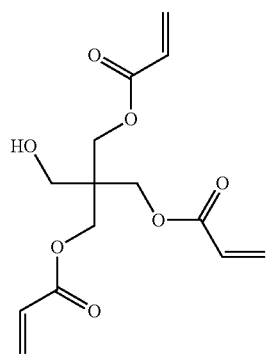
A-57 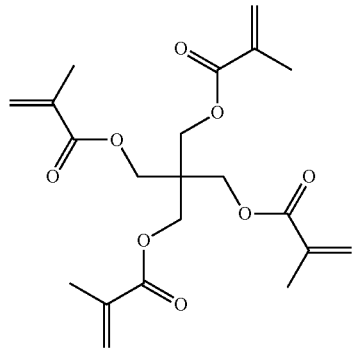
A-58 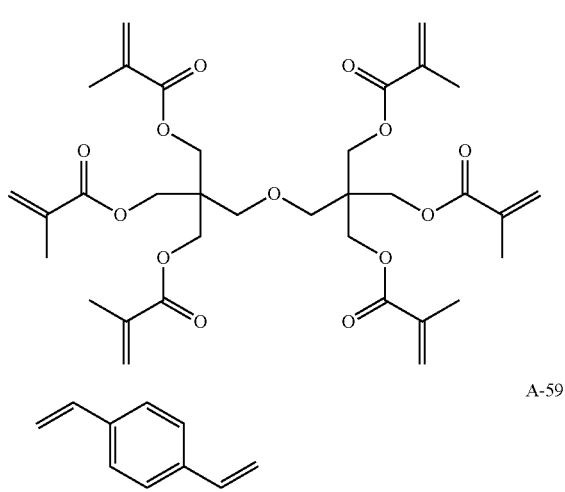
A-59 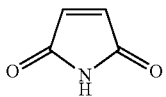
A-60 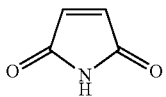
A-61 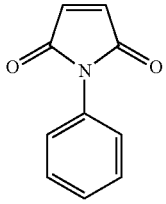
A-62 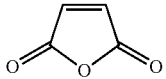
A-63 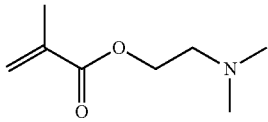
A-64 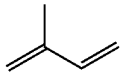
A-65 
A-66 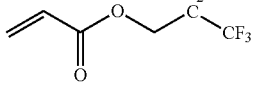
A-67 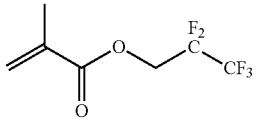
A-68 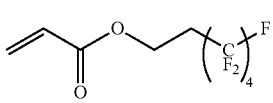
A-69 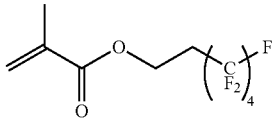
A-70 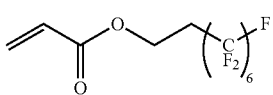
A-71 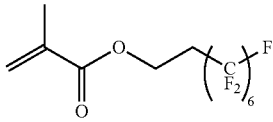
A-72 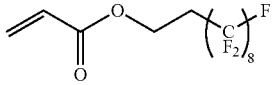

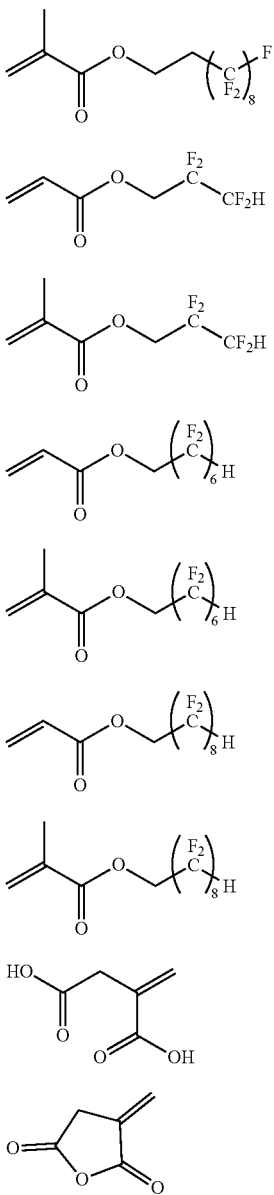

Macromonomer-Derived Constituent Component

Into the polymer constituting the binder particles that are used in the present invention, a macromonomer-derived constituent component having a mass-average molecular weight of 1,000 or more is combined. In the polymer constituting the binder particles, the macromonomer-derived constituent component constituents a side chain with respect to the main chain.

The mass-average molecular weight of the macromonomer is preferably 2,000 or more and more preferably 3,000 or more. The upper limit is less than 1,000,000, preferably 500,000 or less, more preferably 100,000 or less, and particularly preferably 30,000 or less. In a case in which the polymer constituting the binder particles has a side chain having a molecular weight in the above-described range, the polymer can be uniformly dispersed in an organic solvent more favorably and can be mixed with solid electrolyte particles and applied.

Regarding the action of the solid electrolyte composition according to the preferred embodiment of the present invention, it is considered that, in the binder polymer, the macromonomer-derived constituent component has an action of improving the dispersibility in solvents. Therefore, the binder is favorably dispersed in a particle shape in a solvent, and thus it is possible to fix the binder without locally or generally coating the inorganic solid electrolyte and/or the active materials. As a result, it is possible to adhere the particles of the inorganic solid electrolyte and/or the active materials without blocking the electrical connection between the particles, and thus it is considered that an increase in the interface resistance between inorganic solid electrolyte particles, between active material particles, between the collectors, and the like is suppressed. Furthermore, the binder polymer has a macromonomer-derived side chain as a graft chain, whereby the binder particles adhere to the particles of the inorganic solid electrolyte, and an effect of the side chains being entangled together can also be expected. Therefore, it is considered that the bonding property between the particles of the inorganic solid electrolyte and/or the active materials can be further enhanced. Furthermore, the binder polymer has a favorable dispersibility, and thus it is possible to omit a step of transferring the binder polymer to the organic solvent compared with oil-in-water emulsification polymerization, and a solvent having a low boiling point can be used as a dispersion medium. Meanwhile, in the present invention, the molecular weight of the macromonomer-derived constituent component can be identified by measuring the molecular weight of a polymerizable compound (macromonomer) that is combined in the case of synthesizing the polymer constituting the binder particles. A method for measuring the molecular weight will be described below.

The SP value of the macromonomer is preferably 10 or less and more preferably 9.5 or less. The lower limit value is not particularly limited, but is realistically 5 or more.

—Definition of SP Value—

In the present specification, unless particularly otherwise described, the SP value is obtained using the Hoy method (H. L. Hoy Journal of Painting, 1970, Vol. 42, 76-118). In addition, SP values will be mentioned without units, but the unit is $cal^{1/2}$ $cm^{3/2}$. Meanwhile, as the SP value (SPP) of a side chain component, a value computed using the following equation, in which $SP_1$, $SP_2$, . . . respectively represent the SP values of individual repeating units constituting the side chain component, will be used.

$$SP_P^2 = SP_1^2 + SP_2^2 + \ldots$$

The SP value serves as an index indicating the dispersion characteristic in organic solvents. Here, in a case in which the side chain component is provided with a specific molecular weight or more and preferably provided with the above-described SP value or more, it is possible to improve the bonding property with the inorganic solid electrolyte, thus, enhance the affinity to dispersion medium that can be included in the solid electrolyte composition of the present invention, and stably disperse the side chain component, which is preferable.

In a case in which the graft portion of the macromonomer-derived constituent component is used as a side chain, and the other portion is used as the main chain, the main chain structure is not particularly limited. The macromonomer preferably has a polymerizable unsaturated bond and possibly has, for example, a variety of vinyl groups or (meth)acryloyl groups. In the present invention, the macromonomer preferably has, among them, a (meth)acryloyl group.

The macromonomer-derived constituent component preferably includes a constituent component (repeating unit) selected from a (meth)acrylic acid component, a (meth)acrylic acid ester component, and a (meth)acrylonitrile component in the graft chain. In addition, the macromonomer preferably includes a polymerizable double bond and a linear hydrocarbon structure unit S having 6 or more carbon atoms (preferably an alkylene group having 6 or more and 30 or less carbon atoms and more preferably an alkylene group having 8 or more and 24 or less carbon atoms. A part of methylene constituting the alkylene group may have a substituent, or the part of methylene constituting the alkylene group may be substituted with a different structure (an oxygen atom, a sulfur atom, an imino group, a carbonyl group, or the like). In a case in which the macromonomer has the linear hydrocarbon structure unit S as described above, the affinity to solvents becomes high, and an action of improving the dispersion stability can be expected.

The macromonomer preferably has a portion represented by Formula (b-11a).

(b-11a)

$R^{11a}$ is identical to $R^1$. * represents a bonding portion.

As the macromonomer, the polymer preferably has a portion represented by any of Formulae (b-12a) to (b-12c).

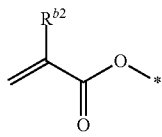
(b-12a)

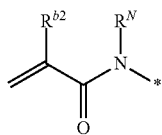
(b-12b)

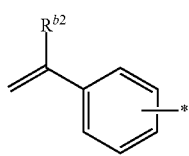
(b-12c)

$R^{b2}$ is identical to $R^1$. * represents a bonding portion. $R^N$ follows a definition described below. Benzene rings of Formulae (b-12c), (b-13c), and (b-14c) may have the random substituent T described below.

A structural part that is present ahead of the bonding portion of * is not particularly limited as long as the molecular weight as the macromonomer is satisfied, but a structural portion constituted of a carbon atom, an oxygen atom, or a hydrogen atom is preferred. At this time, the structural part may have the substituent T described below and may have, for example, a halogen atom (fluorine atom) or the like.

The macromonomer is preferably a compound represented by any of Formulae (b-13a) to (b-13c) or a compound having a repeating unit represented by any of (b-14a) or (b-14c).

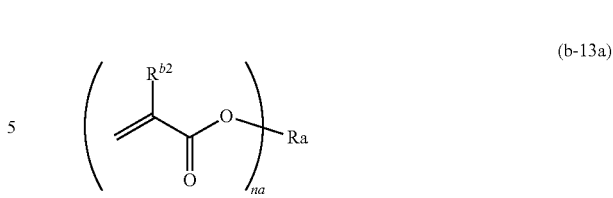
(b-13a)

(b-13b)

(b-13c)

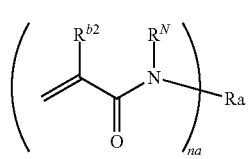
(b-14a)

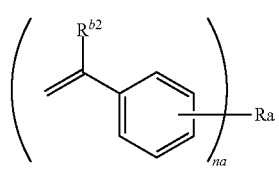
(b-14b)

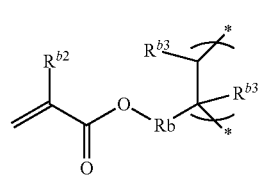
(b-14c)

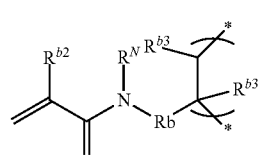

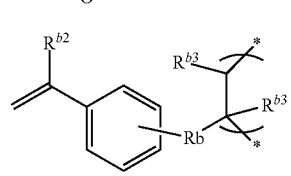

$R^{b2}$ and $R^{b3}$ are identical to $R^1$.

na is not particularly limited, but is preferably an integer of 1 to 6 and more preferably 1 or 2.

Ra represents a substituent (preferably an organic group) in a case in which na is 1 or a linking group in a case in which na is 2 or more.

Rb represents a divalent linking group.

In a case in which Ra and Rb are linking groups, a linking group therebetween is preferably an alkane linking group having 1 to 30 carbon atoms (an alkylene group in a case in which the linking group is divalent), a cycloalkane linking group having 3 to 12 carbon atoms (a cycloalkylene group in a case in which the linking group is divalent), an aryl linking group having 6 to 24 carbon atoms (an arylene group in a case in which the linking group is divalent), a heteroaryl linking group having 3 to 12 carbon atoms (a heteroarylene group in a case in which the linking group is divalent), an ether group (—O—), a sulfide group (—S—), a phosphinidene group (—PR—: R represents a hydrogen atom or an alkyl group having 1 to 6 carbon atoms), a silylene group (—SiRR'—: R and R' represent a hydrogen atom or an alkyl group having 1 to 6 carbon atoms), a carbonyl group, an imino group (—NR$^N$—: here, R$^N$ is, according to a definition described below, preferably a hydrogen atom, an alkyl group having 1 to 6 carbon atoms, or an aryl group having 6 to 10 carbon atoms), or a combination thereof. Among these, an alkane linking group having 1 to 30 carbon atoms (an alkylene group in a case in which the linking group is divalent), an aryl linking group having 6 to 24 carbon atoms (an arylene group in a case in which the linking group is divalent), an ether group, a carbonyl group, or a combination thereof is preferred. In addition, in a case in which Ra and Rb are linking groups, as the linking group therebetween, the following linking group L may be employed.

The linking group constituting Ra and Rb is preferably a linking structure that is constituted of a carbon atom, an oxygen atom, or a hydrogen atom.

In a case in which Ra is a monovalent substituent, examples thereof include the examples of the substituent T, and, among them, an alkyl group, an alkenyl group, and an aryl group are preferred. At this time, Ra may substitute a group through the linking group L, or the linking group L may be interposed in the substituent.

Alternatively, in a case in which Ra is a monovalent substituent, the structure of —Rb-Rc or, here, examples of Rc include the examples of the substituent T, and, among them, an alkyl group, an alkenyl group, and an aryl group are preferred.

At this time, each of Ra and Rb preferably includes at least a hydrocarbon structure unit having 1 to 30 carbon atoms (preferably an alkylene group) and more preferably includes the hydrocarbon structure unit S. In addition, each of Ra to Rc may have a linking group or a substituent, and examples thereof include the linking group L or the substituent T.

The expression of a substituent that is not clearly expressed as substituted or unsubstituted in the present specification (which is also true for a linking group) means that, unless particularly otherwise described, the group may have a random substituent. What has been described above is also true for compounds that are not clearly expressed as substituted or unsubstituted. Examples of the preferred substituent include the substituent T described below.

Examples of the substituent T include substituents described below.

Examples thereof include an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, 1-carboxymethyl, or the like), an alkenyl group (preferably an alkenyl group having 2 to 20 carbon atoms, for example, vinyl, allyl, olefin, or the like), an alkynyl group (preferably an alkynyl group having 2 to 20 carbon atoms, for example, ethynyl, butadiynyl, phenylethynyl, or the like), a cycloalkyl group (preferably a cycloalkyl group having 3 to 20 carbon atoms, for example, cyclopropyl, cyclopentyl, cyclohexyl, 4-methylcyclohexyl, or the like), an aryl group (preferably an aryl group having 6 to 26 carbon atoms, for example, phenyl, 1-naphthyl, 4-methoxyphenyl, 2-chlorophenyl, 3-methylphenyl, or the like), a heterocyclic group (preferably a heterocyclic group having 2 to 20 carbon atoms, more preferably a 5- or 6-membered heterocyclic group having at least one of an oxygen atom, a sulfur atom, and a nitrogen atom, for example, tetrahydropyran, tetrahydrofuran, 2-pyridyl, 4-pyridyl, 2-imidazolyl, 2-benzimidazolyl, 2-thiazolyl, 2-oxazolyl, or the like), an alkoxy group (preferably an alkoxy group having 1 to 20 carbon atoms, for example, methoxy, ethoxy, isopropyloxy, benzyloxy, or the like), an aryloxy group (preferably an aryloxy group having 6 to 26 carbon atoms, for example, phenoxy, 1-naphthyloxy, 3-methylphenoxy, 4-methoxyphenoxy, or the like), an alkoxycarbonyl group (preferably an alkoxycarbonyl group having 2 to 20 carbon atoms, for example, ethoxycarbonyl, 2-ethylhexyloxycarbonyl, or the like), an aryloxycarbonyl group (preferably an aryloxycarbonyl group having 6 to 26 carbon atoms, for example, phenoxycarbonyl, 1-naphthyloxycarbonyl, 3-methyl phenoxycarbonyl, 4-methoxy phenoxycarbonyl, or the like), an amino group (preferably an amino group having 0 to 20 carbon atoms, including an alkylamino group and an arylamino group, for example, amino, N,N-dimethylamino, N,N-diethylamino, N-ethylamino, aniline, or the like), a sulfamoyl group (preferably a sulfamoyl group having 0 to 20 carbon atoms, for example, N,N-dimethylsulfamoyl, N-phenylsulfamoyl, or the like), an acyl group (including an alkylcarbonyl group, an alkenylcarbonyl group, an alkynylcarbonyl group, an arylcarbonyl group, and a heterocyclic carbonyl group; preferably an acyl group having 1 to 20 carbon atoms, for example, acetyl, propionyl, butyryl, octanoyl, hexadecanoyl, acryloyl, methacryloyl, crotonoyl, benzoyl, naphthoyl, nicotinoyl, or the like), an acyloxy group (including an alkylcarbonyloxy group, an alkenylcarbonyloxy group, an alkynylcarbonyloxy group, an arylcarbonyloxy group, and a heterocyclic carbonyloxy group; preferably an acyloxy group having 1 to 20 carbon atoms, for example, acetyloxy, propionyloxy, butynyloxy, octanoyloxy, hexadecanoyloxy, acryloyloxy, methacryloyloxy, crotonoyloxy, benzoyloxy, naphthoyloxy, nicotinoyloxy, or the like), a carbamoyl group (preferably a carbamoyl group having 1 to 20 carbon atoms, for example, N,N-dimethylcarbamoyl, N-phenylcarbamoyl, or the like), an acylamino group (preferably an acylamino group having 1 to 20 carbon atoms, for example, acetylamino, benzoylamino, or the like), an alkylthio group (preferably an alkylthio group having 1 to 20 carbon atoms, for example, methylthio, ethylthio, isopropylthio, benzylthio, or the like), an arylthio group (preferably an arylthio group having 6 to 26 carbon atoms, for example, phenylthio, 1-naphthylthio, 3-methylphenylthio, 4-methoxyphenylthio, or the like), an alkylsulfonyl group (preferably an alkylsulfonyl group having 1 to 20 carbon atoms, for example, methylsulfonyl, ethylsulfonyl, or the like), an arylsulfonyl group (preferably an arylsulfonyl group having 6 to 22 carbon atoms, for example, benzenesulfonyl or the like), an alkylsilyl group (preferably an alkylsilyl group having 1 to 20 carbon atoms, for example, monomethylsilyl, dimethylsilyl, trimethylsilyl, triethylsilyl, or the like), an arylsilyl group (preferably an arylsilyl group having 6 to 42 carbon atoms, for example, triphenylsilyl or the like), a phosphoryl group (preferably a phosphoric group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a sulfo group (a sulfonic acid group), a hydroxy group, a mercapto group, a cyano group, and a halogen atom (for example, a fluorine atom, a chlorine atom, a bromine atom, an iodine atom, or the like).

In addition, in each of the groups exemplified as the substituent T, the substituent T may be further substituted.

In a case in which a compound, a substituent, a linking group, or the like includes an alkyl group, an alkylene group, an alkenyl group, an alkenylene group, an alkynyl group, an alkynylene group, and/or the like, these may have a cyclic shape or a chain shape, may be linear or branched, and may be substituted as described above or unsubstituted.

The respective substituents regulated in the present specification may be substituted through the following linking group L as long as the effects of the present invention are exhibited or the linking group L may be interposed in the structure of the substituent. For example, an alkyl group, an alkylene group, an alkenyl group, an alkenylene group, and the like may further have a hetero linking group described below interposed in the structure.

The linking group L is preferably a hydrocarbon linking group [an alkylene group having 1 to 10 carbon atoms (more preferably having 1 to 6 carbon atoms and still more preferably having 1 to 3 carbon atoms), an alkenylene group having 2 to 10 carbon atoms (more preferably having 2 to 6 carbon atoms and more preferably having 2 to 4), an alkynylene groups having 2 to 10 carbon atoms (more preferably having 2 to 6 carbon atoms and still more preferably having 2 to 4 carbon atoms), and an arylene groups having 6 to 22 carbon atoms (more preferably having 6 to 10 carbon atoms)], a hetero linking group [a carbonyl group (—CO—), a thiolcarbonyl group (—CS—), an ether group (—O—), a thioether group (—S—), an imino group (—NR$^N$—), an imine linking group (R$^N$—N=C<, —N=C (R$^N$)—), a sulfonyl group (—SO$_2$—), a sulfinyl group (—SO—), a phosphoric acid linking group (—O—P(OH)(O)—O—), a phosphonic acid linking group (—P(OH)(O)—O—), or a divalent heterocyclic group], or a linking group made of a combination thereof. Meanwhile, in a case in which a ring is formed through condensation, the hydrocarbon linking group may appropriately form a double bond or a triple bond and links the ring-forming components. The ring to be formed is preferably a five-membered ring or a six-membered ring. The five-membered ring is preferably a nitrogen-containing five-membered ring, and examples of a compound forming the ring include pyrrole, imidazole, pyrazole, indazole, indole, benzoimidazole, pyrrolidine, imidazoline, pyrazolidine, indoline, carbazole, derivatives thereof, and the like. Examples of the six-membered ring include piperidine, morpholine, piperazine, derivatives thereof, and the like. In addition, in a case in which an aryl group, a heterocyclic group, or the like is included, the group may be a single ring or a condensed ring, and, similarly, may be substituted or unsubstituted.

R$^N$ represents a hydrogen atom or a substituent. The definition of the substituent is the same as that described in the section of the substituent T. Examples of the substituent include an alkyl group (preferably having 1 to 24 carbon atoms, more preferably having 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 or 3 carbon atoms), an alkynyl group (preferably having 2 to 24 carbon atoms, more preferably having 2 to 12 carbon atoms, still more preferably having 2 to 6 carbon atoms, and particularly preferably having 2 or 3 carbon atoms), an aralkyl group (preferably having 7 to 22 carbon atoms, more preferably having 7 to 14 carbon atoms, and particularly preferably having 7 to 10 carbon atoms), or an aryl group (preferably having 6 to 22 carbon atoms, more preferably having 6 to 14 carbon atoms, and particularly preferably having 6 to 10 carbon atoms).

R$^P$ is a hydrogen atom, a hydroxy group, or a substituent. The substituent is preferably an alkyl group (preferably having 1 to 24 carbon atoms, more preferably having 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 or 3 carbon atoms), an alkynyl group (preferably having 2 to 24 carbon atoms, more preferably having 2 to 12 carbon atoms, still more preferably having 2 to 6 carbon atoms, and particularly preferably having 2 or 3 carbon atoms), an aralkyl group (preferably having 7 to 22 carbon atoms, more preferably having 7 to 14 carbon atoms, and particularly preferably having 7 to 10 carbon atoms), an aryl group (preferably having 6 to 22 carbon atoms, more preferably having 6 to 14 carbon atoms, and particularly preferably having 6 to 10 carbon atoms), an alkoxy group (preferably having 1 to 24 carbon atoms, more preferably having 1 to 12 carbon atoms, still more preferably having 1 to 6 carbon atoms, and particularly preferably having 1 to 3 carbon atoms), an alkenyloxy group (preferably having 2 to 24 carbon atoms, more preferably having 2 to 12 carbon atoms, still more preferably having 2 to 6 carbon atoms, and particularly preferably having 2 or 3 carbon atoms), an alkynyloxy group (preferably having 2 to 24 carbon atoms, more preferably having 2 to 12 carbon atoms, still more preferably having 2 to 6 carbon atoms, and particularly preferably having 2 or 3 carbon atoms), an aralkyloxy group (preferably having 7 to 22 carbon atoms, more preferably having 7 to 14 carbon atoms, and particularly preferably having 7 to 10 carbon atoms), or an aryloxy group (preferably having 6 to 22 carbon atoms, more preferably having 6 to 14 carbon atoms, and particularly preferably having 6 to 10).

In the present specification, the number of atoms constituting the linking group is preferably 1 to 36, more preferably 1 to 24, still more preferably 1 to 12, and particularly preferably 1 to 6. The number of linking atoms in the linking group is preferably 10 or less and more preferably 8 or less. The lower limit is 1 or more. The number of linking atoms refers to the minimum number of atoms which are located in a path connecting predetermined structural parts and participate in the linking. For example, in the case of —CH$_2$—C(O)—O—, the number of atoms constituting the linking group is six, but the number of linking atoms is three.

Specific examples of the combinations of the linking groups include an oxycarbonyl group (—OCO—), a carbonate group (—OCOO—), an amide group (—CONH—), a urethane group (—NHCOO—), an urea group (—NHCONH—), a (poly)alkyleneoxy group (—(Lr—O)$_x$—), a carbonyl (poly)oxyalkylene group (—CO—(O—Lr)$_x$—), a carbonyl (poly)alkyleneoxy group (—CO—(Lr—O)$_x$—), a carbonyloxy (poly)alkyleneoxy group (—COO—(Lr—O)$_x$—), a (poly)alkyleneimino group (—(Lr—NR$^N$)$_x$—), an alkylene (poly)imino alkylene group (—Lr—(NR$^N$—Lr)$_x$—), a carbonyl (poly)iminoalkylene group (—CO—(NR$^N$—Lr)$_x$—), a carbonyl (poly)alkyleneimino group (—CO—(Lr—NR$^N$)$_x$—), a (poly)ester group (—CO—O—Lr)$_x$—, —(O—CO—Lr)$_x$—, —(O—Lr—CO)$_x$—, —(Lr—CO—O)$_x$—, —(Lr—O—CO)$_x$—), a (poly)amide group (—(CO—NR$^N$—Lr)$_x$—, —(NR$^N$—CO—Lr)$_x$—, —(NR$^N$—Lr—CO)$_x$—), —(Lr—CO—NR$^N$)$_x$—, —(Lr—NR$^N$—CO)$_x$—), and the like. X represents an integer of 1 or more and is preferably 1 to 500 and more preferably 1 to 100.

Lr is preferably an alkylene group, an alkenylene group, or an alkynylene group. The number of carbon atoms in Lr is preferably 1 to 12, more preferably 1 to 6, and particularly preferably 1 to 3. A plurality of Lr's, R$^N$'s, R$^P$'s, x's, and the like does not need to be identical to each other. The orientation of the linking group is not limited by the above description and may be understood to be an orientation that appropriately matches a predetermined chemical formula.

The macromonomer is preferably a polyurea or polyurethane having a structural portion that is solvated in a hydrocarbon-based solvent (solvated portion) and a structural portion that is not solvated (non-solvated portion). The polyurea or polyurethane is preferably particles having a long-chain alkyl group having 6 or more carbon atoms. The above-described particles can be obtained by, for example, reacting a diol compound having a long-chain alkyl group having 6 or more carbon atoms (so-called lipophilic diol), an isocyanate compound, and a polyamine (polyol in the case of a polyurethane) compound in a non-aqueous solvent. That is, it is possible to impart the structural portion that is solvated in a hydrocarbon-based solvent of a long-chain alkyl group having 6 or more carbon atoms or the like to particles. Meanwhile, instead of the lipophilic diol and the isocyanate compound, a terminal NCO prepolymer made of these compounds may be reacted.

The lipophilic diol is a polyol having 2 or less functional groups and preferably has a molecular weight of 700 or more and less than 5,000. However, the lipophilic diol is not limited thereto. Specific examples of the lipophilic diol include lipophilic diols obtained by adding approximately two or less hydroxy groups to a fat and oil using a method of turning a variety of fats and oils into an alcoholysis using a lower alcohol and/or a glycol, a method of partially saponifying a fat and oil, a method of esterifying a hydroxy group-containing aliphatic acid using a glycol, or the like, the fat and oil-modified polyols, the terminal alcohol-modified acrylic resins, and the terminal alcohol-modified polyesters described in j. h. SAUNDERS and K. C. FRISCH's POLYURETHANES, CHEMISTRY AND TECHNOLOGY PART 1, Chemistry (pp. 48 to 53, published on 1962) and the like, and the like.

Among the above-described lipophilic diols, examples of the hydroxy group-containing aliphatic acid include ricinoleic acid, 12-hydroxystearic acid, castor oil aliphatic acid, hydrogenated castor oil aliphatic acid, and the like.

Examples of the terminal alcohol-modified acrylic resins include polymers of a long-chain alkyl (meth)acrylate for which thioglycerol is used as a chain transfer agent and the like. As the polymer of an alkyl (meth)acrylate, one or more kinds of alkyl (meth)acrylates having 6 or more and less than 30 carbon atoms are preferably used. More preferred are alkyl (meth)acrylates having 8 or more and less than 25 carbon atoms (particularly preferably having 10 or more and less than 20 carbon atoms).

As the isocyanate compound, it is possible to apply all of the ordinary isocyanate compounds, and particularly preferred are aliphatic or alicyclic diisocyanate compounds such as hexamethylene diisocyanate, water-added toluene diisocyanate (water-added TDI), water-added diphenylmethane diisocyanate (water-added MDI), and isophorone diisocyanate.

Examples of the amine compound include ethylenediamine, diaminopropane, diaminobutane, hexamethylenediamine, trimethylhexamethylenediamine, N-aminoethylpiperazine, bis-aminopropylpiperazine, polyoxypropylenediamine, 4,4-diaminodicyclohexylmethane, isophoronediamine, thiourea, methylimino bispropylamine, and the like. The amine compound may be used singly or two or more amine compounds may be used in a mixture.

As the macromonomer, macromonomer having an ethylenic unsaturated bond in the terminal may also be used. Here, the macromonomer is made up of a polymer chain portion and a portion of a polymerizable functional group having an ethylenic unsaturated double bond in the terminal.

The copolymerization ratio of the constituent component derived from the macromonomer is not particularly limited, but is preferably 3% by mass or more, more preferably 10% by mass or more, and particularly preferably 20% by mass or more of the polymer constituting the binder particles. The upper limit is preferably 70% by mass or less, more preferably 60% by mass or less, and particularly preferably 50% by mass or less. Meanwhile, the copolymerization ratio can be computed from the amount of a monomer prepared which is used for the synthesis of the binder particles (the amount used). However, the amount of a monomer having a group including a ring structure of two or more rings prepared (the amount used) is not included.

—Group Including Ring Structure of Two or More Rings—

The group including a ring structure of two or more rings which is used in the present invention needs to be a group in which at least one hydrogen atom of a compound having a ring (preferable condensed ring) structure of two or more rings is substituted with a bonding site and is preferably a group in which at least one hydrogen atom of a compound represented by General Formula (D) is substituted with a bonding site, more preferably a group in which one or two hydrogen atoms is substituted with a bonding site, and particularly preferably a group in which one hydrogen atom is substituted with a bonding site.

A group formed of the compound represented by General Formula (D) has an excellent affinity to carbonaceous materials and is thus capable of improving the dispersion stability of the solid electrolyte composition of the present invention which contains the binder particles and capable of improving the bonding property of a sheet for an all-solid state secondary battery and an electrode sheet for an all-solid state secondary battery. Due to the improvement of the dispersion stability and the improvement of the bonding property, all-solid state secondary batteries produced using the solid electrolyte composition of the present invention have excellent cycle characteristics. From the viewpoint of improving the cycle characteristics, the group including a ring structure of two or more rings is preferably a group including a ring structure of three or more rings and more preferably a group including a ring structure of four or more rings. The upper limit of the number of rings is not particularly limited, but is preferably 18 or less, more preferably 16 or less, still more preferably 12 or less, still more preferably 8 or less, and still more preferably 6 or less.

General Formula (D)

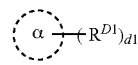

In General Formula (D), a ring α represents a ring of two or more rings, $R^{D1}$ represents a substituent that bonds to a constituent atom of the ring α, and d1 represents an integer of 1 or more. In a case in which d1 is 2 or more, a plurality of $R^{D1}$'s may be identical to or different from each other. $R^{D1}$'s substituting adjacent atoms may bond together and thus form a ring. The ring α is preferably two or more rings, more preferably three or more rings, and still more preferably four or more rings. In addition, the ring α is preferably 18 or less rings, more preferably 16 or less rings, still more preferably 12 or less rings, still more preferably 8 or less rings, and still more preferably 6 or less rings. The ring α preferably contains a ring structure of a three or more-membered ring, more preferably contains a ring structure of a four or more-membered ring, still more preferably contains a ring structure of a five or more-membered ring, and particularly preferably contains a ring structure of a six-membered ring. In addition, the ring α preferably contains a ring structure of a 24 or less-membered ring, more preferably contains a ring structure of a 12 or less-membered ring, still more preferably contains a ring structure of an eight or less-membered ring, and particularly preferably contains a ring structure of a six-membered ring.

The ring α preferably contains a structure of any of an aliphatic hydrocarbon ring, an unsaturated hydrocarbon ring, an aromatic ring, and a heterocycle or a combination thereof. Examples of the specific structure of the aliphatic hydrocarbon ring include cyclopropane, cyclobutane, cyclopentane, cyclohexane, cycloheptane, cyclooctane, cyclononane, cyclodecane, cycloundecane, cyclododecane, decalin, and the like.

Examples of the specific structure of the unsaturated hydrocarbon ring include ring structures in which a part of the aliphatic hydrocarbon ring is substituted with a double bond. Examples thereof include cyclobutene, cyclopentene, cyclopentadiene, cyclohexene, cyclohexadiene, cyclooctene, cyclooctadiene, and the like.

Examples of the specific structure of the aromatic ring include benzene, naphthalene, anthracene, pyrene, tetracene, pentacene, phenanthrene, chrysene, triphenylene, tetraphene, picene, pentaphene, perylene, helissene, coronene, and the like.

Examples of the specific structure of the heterocycle include ethyleneimine, ethylene oxide, ethylene sulfide, acetylene oxide, azacyclobutane, 1,3-propylene oxide, trimethylene sulfide, pyrrolidine, tetrahydrofuran, tetrahydrothiophene, pyrrole, furan, thiophene, piperidine, tetrahydropyran, tetrahydrothiopyran, pyridine, hexamethylene imine, hexamethylene oxide, hexamethylene sulfide, azatropilidene, oxacycloheptatriene, thiotropilidene, imidazole, oxazole, thiazole, imidazoline, pyrazine, morpholine, thiazine, indole, isoindole, benzoimidazole, purine, quinoline, isoquinoline, quinoxaline, cinnoline, pteridine, chromene, isocromene, acridine, xanthene, benzoquinoline, carbazole, benzo-O-cinnoline, porphyrin, chlorin, choline, and the like.

Among these, the ring α is preferably a structure containing cyclobutane, cyclopentane, cyclohexane, cycloheptane, cyclooctane, cyclobutene, cyclopentene, cyclopentadiene, cyclohexene, cyclohexadiene, cyclooctene, benzene, naphthalene, anthracene, pyrene, tetracene, phenanthrene, triphenylene, pyrrolidine, tetrahydrofuran, tetrahydrothiophene, pyrrole, furan, thiophene, piperidine, pyridine, hexamethylene imine, hexamethylene oxide, hexamethylene sulfide, imidazole, oxazole, thiazole, imidazoline, pyrazine, morpholine, thiazine, indole, isoindole, benzoimidazole, quinoline, benzoquinoline, xanthene, carbazole, or porphyrin, more preferably contains cyclopentane, cyclohexane, cycloheptane, cyclopentene, cyclopentadiene, cyclohexene, cyclohexadiene, benzene, naphthalene, anthracene, pyrene, triphenylene, pyrrole, furan, thiophene, piperidine, pyridine, imidazole, oxazole, or indole, and is particularly preferably a structure containing cyclopentane, cyclohexane, cyclohexene, or pyrene.

Preferred examples of the substituent represented by $R^{D1}$ include the substituent T. In addition, the substituent represented by $R^{D1}$ is also preferably =O. Examples of the ring α having the above-described =O include structures including anthraquinone.

Since the group including a ring structure of two or more rings is included in the side chain of the polymer constituting the binder that is used in the present invention and or the side chain of the macromonomer component as described below, it is preferable that $R^{D1}$ has the portion represented by Formula (b-11a) and/or the linking group L and $R^{D1}$ is $P^1$ described below.

The polymer constituting the binder that is used in the present invention may have the group including a ring structure of two or more rings in any of the main chain, side chain, or terminal of the polymer.

Hereinafter, a case in which a compound having the ring structure of two or more rings is the compound represented by General Formula (D) will be described as an example.

Having the group in the main chain of the polymer means that the compound represented by General Formula (D) is incorporated into the polymer with a structure in which at least two hydrogen atoms of the compound represented by General Formula (D) are substituted with bonding sites and serves as the main chain which becomes the repeating structure of the polymer. On the other hand, having the group in the side chain of the polymer means that the compound represented by General Formula (D) is incorporated into the polymer with a structure in which one hydrogen atom of the compound represented by General Formula (D) is substituted with a bonding site. In addition, having the group in the terminal of the polymer means that the compound represented by General Formula (D) is incorporated into the polymer with a structure in which one hydrogen atoms of the compound represented by General Formula (D) is substituted with a bonding site and serves as the chain length of the polymer. Here, a plurality of the main chains and side chains of the polymer and the terminals of the polymer may be included.

In the present invention, the polymer constituting the binder preferably has the group including a ring structure of two or more rings in the main chain or the side chain, more preferably has the group in the side chain, and particularly preferably has the group in the side chain of the macromonomer-derived constituent component (the graft chain of the macromonomer-derived constituent component). Having the group in the side chain of the macromonomer component means that a repeating unit having a structure in which one hydrogen atom of the compound represented by General Formula (D) is substituted with a bonding site as the side chain is incorporated into the macromonomer component as one of the repeating units constituting the macromonomer component.

In a case in which the group including a ring structure of two or more rings is incorporated into the side chain of the polymer constituting the binder that is used in the present invention, the mobility of the group including a ring structure of two or more rings improves, and thus the adsorption property improves. Therefore, it is possible to further improve the bonding property between solid particles in all-solid state secondary batteries. In a case in which the group including a ring structure of two or more rings is incorporated into the side chain of the macromonomer component of the polymer constituting the binder that is used in the present invention, the proportion of the group including a ring structure of two or more rings which is present on the surfaces of the binder particles increases, and it is possible to further improve the bonding property between solid particles in all-solid state secondary batteries.

In the present invention, the content of the repeating unit having the group including a ring structure of two or more rings is preferably 10% by mass or more and 85% by mass or less, more preferably 15% by mass or more and 80% by mass or less, and particularly preferably 18% by mass or more and 70% by mass or less with respect to 100% by mass of the polymer constituting the binder. In a case in which the content of the repeating unit having the group including a ring structure of two or more rings is in the above-described range, it is possible to satisfy both the adsorption property and the dispersion stability of the binder particles, which is preferable.

Meanwhile, the content of the repeating unit having the group including a ring structure of two or more rings can be computed from the amount of the monomer that is used for the synthesis of the binder particles prepared (the amount used). In Table 1 below, the sum of components having the group including a ring structure of two or more rings among components represented by M1 to M4 and MM is the content of the repeating unit having the group including a ring structure of two or more rings. For example, in BP-5 in Table 1, M4 (B-5) and MM (MM-2) have the group including a ring structure of two or more rings, and the content of the repeating unit having the group including a ring structure of two or more rings is 40% by mass.

In addition, in the present invention, the compound represented by General Formula (D) is preferably at least one of a compound represented by General Formula (1) and an aliphatic hydrocarbon represented by General Formula (2).

The compound represented by General Formula (1) and the aliphatic hydrocarbon represented by General Formula (2) have an excellent affinity to carbonaceous materials that are negative electrode active materials. Therefore, it is possible to further improve the dispersion stability of the solid electrolyte composition containing the above-described compounds and improve the bonding property of electrode sheets. In addition, due to the improvement of the dispersion stability and the improvement of the bonding property, it is possible to improve the cycle characteristics of all-solid state secondary batteries produced using this solid electrolyte composition.

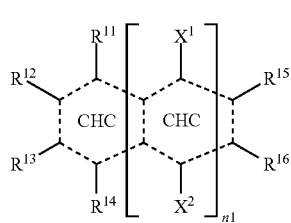

General Formula (1)

In General Formula (1), CHC represents a benzene ring, a cyclohexane ring, a cyclohexene ring, or a cyclohexadiene ring. n1 represents an integer of 0 to 8. $R^{11}$ to $R^{16}$ each independently represent a hydrogen atom or a substituent. In the case of not being a benzene ring, CHC may have a hydrogen atom at a portion other than $R^{11}$ to $R^{16}$ in the ring structure. $X^1$ and $X^2$ each independently represents a hydrogen atom or a substituent. Here, in $R^{11}$ to $R^{16}$, $X^1$, and $X^2$, mutually adjacent groups may bond to each other and thus form a 5 or 6-membered ring. However, in a case in which n1 is 0, any one substituent of $R^{11}$ to $R^{16}$ is —(CHC$^1$)$_{m1}$—Rx or any two of $R^{11}$ to $R^{16}$ bond together and thus form —(CHC$^1$)$_{m1}$—. Here, CHC$^1$ represents a phenylene group, a cycloalkylene group, or a cycloalkenylene group, m1 represents an integer of 2 or more, and Rx represents a hydrogen atom or a substituent. In addition, in a case in which n1 is 1, in $R^{11}$ to $R^{16}$, $X^1$, and $X^2$, at least two atoms or substituents that are adjacent to each other bond together and thus form a benzene ring, a cyclohexane ring, a cyclohexene ring, or a cyclohexadiene ring.

Examples of the substituent represented by $R^{11}$ to $R^{16}$ include an alkyl group, an aryl group, a heteroaryl group, an alkenyl group, an alkynyl group, an alkoxy group, an aryloxy group, a heteroaryloxy group, an alkylthio group, an arylthio group, a heteroarylthio group, an acyl group, an acyloxy group, an alkoxycarbonyl group, an aryloxycarbonyl group, an alkylcarbonyloxy group, an arylcarbonyloxy group, a hydroxy group, a carboxy group or a salt thereof, a sulfo group or a salt thereof, an amino group, a mercapto group, an amide group, a formyl group, a cyano group, a halogen atom, a (meth)acryl group, a (meth)acryloyloxy group, a (meth)acrylamide group, an epoxy group, an oxetanyl group, and the like.

Meanwhile, hereinafter, a formyl group will be described as one of the acyl groups.

The number of carbon atoms in the alkyl group is preferably 1 to 30, more preferably 1 to 25, and particularly preferably 1 to 20. Specific examples thereof include methyl, ethyl, propyl, isopropyl, butyl, t-butyl, octyl, dodecyl, stearyl, benzyl, naphthylmethyl, pyrenylmethyl, and pyrenylbutyl. The alkyl group more preferably contains an unsaturated carbon bond of a double bond or a triple bond therein.

The number of carbon atoms in the aryl group is preferably 6 to 30, more preferably 6 to 26, and particularly preferably 6 to 15. Specific examples thereof include phenyl, naphthyl, anthracene, terphenyl, tolyl, xylyl, methoxyphenyl, cyanophenyl, and nitrophenyl.

The number of carbon atoms in the heteroaryl group is preferably 6 to 30, more preferably 6 to 26, and particularly preferably 6 to 15. Specific examples thereof include furan, pyridine, thiophene, pyrrole, triazine, imidazole, tetrazole, pyrazole, thiazole, and oxazole.

The number of carbon atoms in the alkenyl group is preferably 2 to 30, more preferably 2 to 25, and particularly preferably 2 to 20. Specific examples thereof include vinyl and propenyl.

The number of carbon atoms in the alkynyl group is preferably 2 to 30, more preferably 2 to 25, and particularly preferably 2 to 20. Specific examples thereof include ethynyl, propynyl, and phenylethynyl.

Alkoxy group: The preferred range is the same as that of the alkyl group except for the fact that the atom that directly bonds to the ring represented by CHC in General Formula (1) is an oxygen atom.

Aryloxy group: The preferred range is the same as that of the aryl group except for the fact that the atom that directly bonds to the ring represented by CHC in General Formula (1) is an oxygen atom.

Heteroaryloxy group: The preferred range is the same as that of the heteroaryl group except for the fact that the atom that directly bonds to the ring represented by CHC in General Formula (1) is an oxygen atom.

Alkylthio group: The preferred range is the same as that of the alkyl group except for the fact that the atom that directly bonds to the ring represented by CHC in General Formula (1) is a sulfur atom.

Arylthio group: The preferred range is the same as that of the aryl group except for the fact that the atom that directly bonds to the ring represented by CHC in General Formula (1) is a sulfur atom.

Heteroarylthio group: The preferred range is the same as that of the heteroaryl group except for the fact that the atom that directly bonds to the ring represented by CHC in General Formula (1) is a sulfur atom.

Acyl group: The number of carbon atoms is preferably 1 to 30, more preferably 1 to 25, and particularly preferably 1 to 20. The acyl group includes a formyl group, an aliphatic carbonyl group, an aromatic carbonyl group, and a heterocyclic carbonyl group. Examples thereof include the following groups.

Formyl, acetyl (methylcarbonyl), benzoyl (phenylcarbonyl), ethylcarbonyl, acryloyl, methacryloyl, octylcarbonyl, dodecylcarbonyl (stearic acid residue), a linoleic acid residue, and a linolenic acid residue Acyloxy group: The number of carbon atoms is preferably 1 to 30, more preferably 1 to 25, and particularly preferably 1 to 20. The preferred range is the same as that of the acyl group except for the fact that the atom that directly bonds to the ring represented by CHC in General Formula (1) is an oxygen atom.

Alkoxycarbonyl group: The number of carbon atoms is preferably 2 to 30, more preferably 2 to 25, and particularly preferably 2 to 20. The preferred range is the same as that of the alkyl group except for the fact that the atom that directly bonds to the ring represented by CHC in General Formula (1) is (*—C(O)O—). Meanwhile, the * portion bonds to the ring represented by CHC.

Aryloxycarbonyl group: The number of carbon atoms is preferably 7 to 30, more preferably 7 to 25, and particularly preferably 7 to 20. The preferred range is the same as that of the aryl group except for the fact that the atom that directly bonds to the ring represented by CHC in General Formula (1) is (*—C(O)O—). Meanwhile, the * portion bonds to the ring represented by CHC.

Alkylcarbonyloxy group: The number of carbon atoms is preferably 2 to 30, more preferably 2 to 25, and particularly preferably 2 to 20. The preferred range is the same as that of the alkyl group except for the fact that the atom that directly bonds to the ring represented by CHC in General Formula (1) is (*—O—C(O)—). Meanwhile, the * portion bonds to the ring represented by CHC.

Arylcarbonyloxy group: The number of carbon atoms is preferably 7 to 30, more preferably 7 to 25, and particularly preferably 7 to 20. The preferred range is the same as that of the aryl group except for the fact that the atom that directly bonds to the ring represented by CHC in General Formula (1) is (*—O—C(O)—). Meanwhile, the * portion bonds to the ring represented by CHC.

These substituents, generally, can be introduced by the electrophilic substitution reaction, nucleophilic substitution reaction, halogenation, sulfonation, or diazotation of the aromatic hydrocarbon represented by General Formula (1), or a combination thereof. Examples thereof include alkylation by the Friedel-Crafts reaction, acylation by the Friedel-Crafts reaction, the Vilsmeier-Haack reaction, a transition metal catalyst coupling reaction, and the like.

n1 is more preferably an integer of 0 to 6 and particularly preferably an integer of 1 to 4.

The compound represented by General Formula (1) is preferably a compound represented by General Formula (1-1) or (1-2).

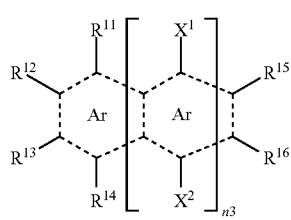

General Formula (1-1)

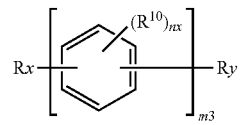

General Formula (1-2)

In General Formula (1-1), Ar represents a benzene ring. $R^{11}$ to $R^{16}$, $X^1$, and $X^2$ are identical to $R^{11}$ to $R^{16}$, $X^1$, and $X^2$ in General Formula (1), and preferred ranges thereof are also identical. n3 represents an integer of 1 or more. Here, in a case in which n3 is 1, in $R^{11}$ to $R^{16}$, $X^1$, and $X^2$, at least two groups adjacent to each other may bond to each other and thus form a benzene ring.

In General Formula (1-2), Rx is identical to Rx in General Formula (1), and a preferred range thereof is also identical. $R^{10}$ represents a substituent, and nx represents an integer of 0 to 4. m3 represents an integer of 3 or more. Ry represents a hydrogen atom or a substituent. Here, Rx and Ry may bond to each other.

n3 is preferably an integer of 1 to 6, more preferably an integer of 1 to 3, and particularly preferably an integer of 1 or 2.

m3 is preferably an integer of 3 to 10, more preferably an integer of 3 to 8, and particularly preferably an integer of 3 to 5.

Specific examples of the compound represented by General Formula (1) include compounds having a structure of naphthalene, anthracene, phenanthracene, pyrene, tetracene, tetraphene, chrysene, triphenylene, pentacene, pentaphene, perylene, benzo [a] pyrene, coronene, anthanthrene, corannulene, ovalene, graphene, cycloparaphenylene, polyparaphenylene, or cyclophene. However, the present invention is not limited thereto.

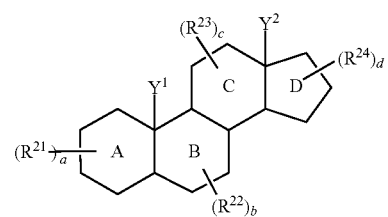

General Formula (2)

In General Formula (2), $Y^1$ and $Y^2$ each independently represents a hydrogen atom, a methyl group, or a formyl group. $R^{21}$, $R^{22}$, $R^{23}$, and $R^{24}$ each independently represent a substituent, and a, b, c, and d each independently represents an integer of 0 to 4, Here, an A ring may be a saturated ring or an unsaturated ring having one or two double bonds or an aromatic ring, and a B ring and a C ring may be an unsaturated ring having one or two double bonds. Meanwhile, in a case in which a, b, c, or d is an integer of 2 to 4, substituents adjacent to each other may bond together and thus form a ring.

The aliphatic hydrocarbon represented by General Formula (2) is a compound having a steroid skeleton.

Here, the carbon numbers in the steroid skeleton are as illustrated below.

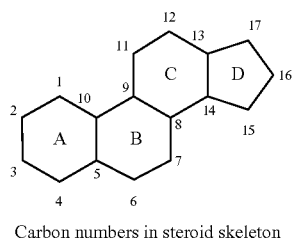

Carbon numbers in steroid skeleton

First, the aliphatic hydrocarbon represented by General Formula (2) will be described.

The substituent as $R^{21}$, $R^{22}$, $R^{23}$, or $R^{24}$ may be any substituent, but is preferably an alkyl group, an alkenyl group, a hydroxy group, a formyl group, an acyl group, a carboxy group or a salt thereof, a (meth)acryl group, a (meth)acryloyloxy group, a (meth)acrylamide group, an epoxy group, or an oxetanyl group, and is preferably a =O group in which two substituents substituting the same carbon atom are commonly formed.

The alkyl group is preferably an alkyl group having 1 to 12 carbon atoms and may have a substituent. The substituent may be any substituent, and examples thereof include an alkyl group, an alkenyl group, a hydroxy group, a formyl group, an acyl group, a carboxy group, an alkoxycarbonyl group, a carbamoyl group, and a sulfo group. The alkyl group more preferably contains an unsaturated carbon bond of a double bond or a triple bond therein.

The alkenyl group is preferably an alkenyl group having 1 to 12 carbon atoms and may have a substituent. The substituent may be any substituent, and examples thereof include an alkyl group, an alkenyl group, a hydroxy group, a formyl group, an acyl group, a carboxy group, an alkoxycarbonyl group, a carbamoyl group, and a sulfo group.

$R^{21}$ preferably substitutes the carbon number 3, $R^{22}$ preferably substitutes the carbon number 6 or 7, $R^{23}$ preferably substitutes the carbon number 11 or 12, and $R^{24}$ preferably substitutes the carbon number 17.

$Y^1$ or $Y^2$ is preferably a hydrogen atom or a methyl group.

a, b, c, or d is preferably an integer of 0 to 2.

In a case in which the A ring is an unsaturated ring, the double bond is preferably a bond of the carbon numbers 4 and 5; in a case in which the B ring is an unsaturated ring, the double bond is preferably a bond of the carbon numbers 5 and 6 or 6 and 7; in a case in which the C ring is an unsaturated ring, the double bond is preferably a bond of the carbon numbers 8 and 9.

Meanwhile, the scope of the compound represented by General Formula (2) include any stereoisomers thereof. In a case in which the paper downward direction is represented by α, and the paper upward direction is represented by β, the bonding direction of the substituent may be any of α or β or a mixture thereof. In addition, the disposition of the A/B rings, the disposition of the B/C rings, or the disposition of the C/D rings may be any of a trans disposition or a cis disposition or may be a mixed disposition thereof.

In the present invention, it is preferable that the total of a to d is 1 or more and any of $R^{21}$, $R^{22}$, $R^{23}$, or $R^{24}$ is a hydroxy group or an alkyl group having a substituent.

The compound having the steroid skeleton is preferably a steroid as illustrated below.

In the following illustration, a substituent that is present in a steroid ring is sterically controlled.

From the left, cholestans, cholanes, pregnanes, androstanes, and estranes are illustrated.

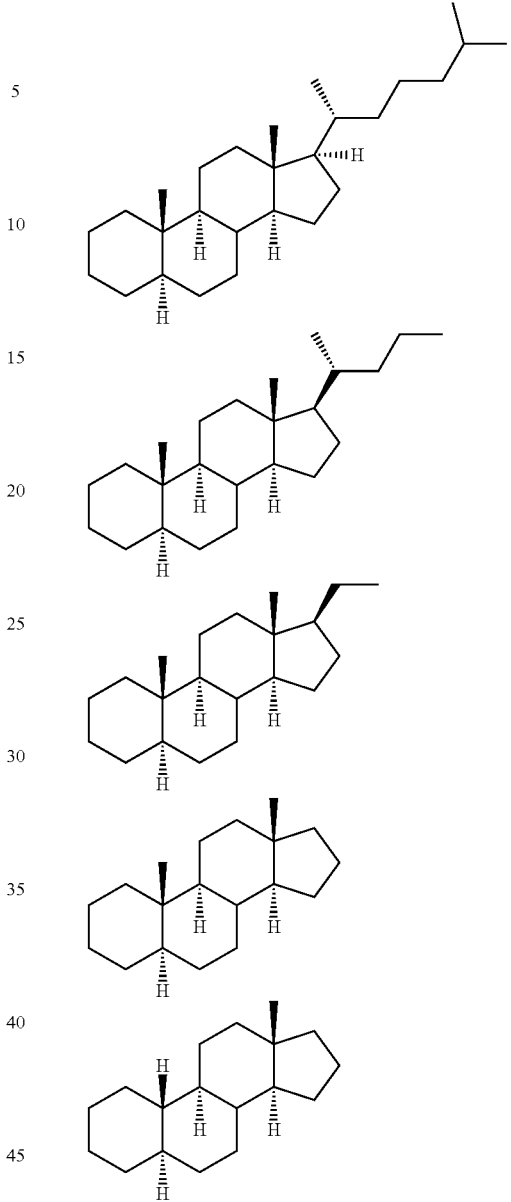

Specific examples of the aliphatic hydrocarbon represented by General Formula (2) include compounds including a structure of cholesterol, ergosterol, testosterone, estradiol, aldosterone, hydrocortisone, stigmasterol, timosterol, lanosterol, 7-dehydrodesostolol, 7-dehydrocholesterol, cholanic acid, cholic acid, lithocholic acid, deoxycholic acid, sodium deoxycholate, lithium deoxycholate, hyodeoxycholic acid, chenodeoxycholic acid, ursodeoxycholic acid, dehydrocholic acid, faucolic acid, or hyocholic acid. However, the present invention is not limited thereto.

As the aliphatic hydrocarbon represented by General Formula (2), it is possible to use a commercially available product.

In the compound represented by General Formula (D), it is preferable that at least one of $R^{D1}$'s is $L^1$-$P^1$ or at least two of $R^{D1}$'s each are independently $L^2$-$P^2$ or $L^3$-$P^3$, and the former case is more preferred. In General Formula (1), it is preferable that at least one of $R^{11}$ to $R^{16}$, $X^1$, and $X^2$ is $L^1$-$P^1$ or at least two of $R^{11}$ to $R^{16}$, $X^1$, and $X^2$ each are independently $L^2$-$P^2$ or $L^3$-$P^2$, and the former case is more preferred. In General Formula (2), it is preferable that at least one of $R^{21}$, $R^{22}$, $R^{23}$, and $R^{24}$ is $L^1$-$P^1$ or at least two of $R^{D1}$'s each are independently $L^2$-$P^2$ or $L^3$-$P^2$, and the former case is more preferred.

Meanwhile, $L^1$-$P^1$ bond to a ring through $L^1$. In addition, $L^2$-$P^2$ and $L^3$-$P^2$ bond to a ring through $L^2$ and $L^3$.

$L^1$ represents a single bond or a linking group. The linking group is preferably a hydrocarbon linking group [an alkylene group having 1 to 10 carbon atoms (more preferably having 1 to 6 carbon atoms and still more preferably having 1 to 3 carbon atoms), an alkenylene group having 2 to 10 carbon atoms (more preferably having 2 to 6 carbon atoms and more preferably having 2 to 4), an alkynylene groups having 2 to 10 carbon atoms (more preferably having 2 to 6 carbon atoms and still more preferably having 2 to 4 carbon atoms), and an arylene groups having 6 to 22 carbon atoms (more preferably having 6 to 10 carbon atoms), or a combination thereof], a hetero linking group [a carbonyl group (—CO—), a thiolcarbonyl group (—CS—), an ether group (—O—), a thioether group (—S—), an imino group (—NR$^N$—), an ammonium linking group (—NR$^N_2{}^+$—), a polysulfide group (having 1 to 8 sulfur atoms), an imine linking group (R$^N$—N=C<, —N=C(R$^N$)—), a sulfonyl group (—SO$_2$—), a sulfinyl group (—SO—), a phosphoric acid linking group (—O—P(OH)(O)—O—), a phosphonic acid linking group (—P(OH)(O)—O—), or a combination thereof], or a linking group made of a combination thereof. R$^N$ in $L^1$ represents a hydrogen atom or an alkyl group having 1 to 12 carbon atoms (preferably having 1 to 4 carbon atoms and more preferably having 1 or 2 carbon atoms).

Meanwhile, in a case in which the substituents or the linking groups are condensed and form a ring, the hydrocarbon linking groups may appropriately form a double bond or a triple bond and link together. The ring to be formed is preferably a five-membered ring or a six-membered ring. The five-membered ring is preferably a nitrogen-containing five-membered ring, and examples of a compound forming the ring include pyrrole, imidazole, pyrazole, indazole, indole, benzoimidazole, pyrrolidine, imidazolidine, pyrazolidine, indoline, carbazole, derivatives thereof, and the like. Examples of the six-membered ring include piperidine, morpholine, piperazine, and derivatives thereof. In addition, in a case in which the compound includes an aryl group, a heterocyclic group, or the like, the group may be a single ring or a condensed ring, and, similarly, may be substituted or unsubstituted.

In a case in which $L^1$ is a linking group made of combinations, the number of combinations is not particularly limited, but is, for example, preferably 2 to 30, more preferably 2 to 20, still more preferably 2 to 10, and particularly preferably 2 to 4. Examples of the linking group made of combinations include an alkylene group having 1 to 6 carbon atoms (preferably having 1 to 4 carbon atoms), an arylene group having 6 to 24 carbon atoms (preferably having 6 to 10 carbon atoms), an ether group (—O—), a thioether group (—S—), an imino group (NR$^N$), a carbonyl group, a (poly)alkyleneoxy group, a (poly)ester group, a (poly)amide group, or groups relating to a combination thereof. Among these, $L^1$ is more preferably an alkylene group having 1 to 4 carbon atoms, an ether group (—O—), an imino group (NR$^N$), a carbonyl group, a (poly)alkyleneoxy group, a (poly)ester group, or a group relating to a combination thereof. Additional examples thereof include linking groups having a monomer exemplified below.

In a case in which $L^1$ is a group which may have a substituent, $L^1$ may further have another substituent. Examples of the substituent include the substituent T, and, among these, a halogen atom (preferably a fluorine atom or a chlorine atom), an alkyl group, an acyl group, a carbamoyl group, and a hydroxy group are preferred.

$L^1$ preferably has a length of a certain value or more. Specifically, the number of the shortest atoms that link the ring α (the ring α, among atoms constituting the ring structure in General Formula (1) or (2), an atom that $L^1$ bonds) and $P^1$ is preferably two atoms or more, more preferably four atoms or more, still more preferably six atoms or more, and particularly preferably eight atoms or more. The upper limit is preferably 1,000 atoms or less, more preferably 500 atoms or less, still more preferably 100 atoms or less, and particularly preferably 20 atoms or less.

$L^2$ and $L^3$ are identical to $L^1$ and may be identical to or different from each other.

$P^1$ is a polymerizable portion. The polymerizable portion refers to a group that can be polymerized by a polymerization reaction, and examples thereof include groups that do chain polymerization such as an ethylenic unsaturated group, an epoxy group, or an oxetanyl group. In addition, examples thereof include groups having two or more of a hydroxy group, an amino group, a carboxy group, an isocyanate group, and the like, and examples of groups that do condensation polymerization include groups having one or more dicarboxylic acid anhydride structures and the like.

Meanwhile, examples of the ethylenic unsaturated group include a (meth)acryloyl group, a (meth)acryloyloxy group, a (meth)acrylamide group, and a vinyl group (including an allyl group).

$P^1$ is preferably a partial structure containing one or more ethylenic unsaturated groups, epoxy groups, oxetanyl groups, or dicarboxylic acid anhydrides or two or more hydroxy groups, amino groups, or isocyanate groups, more preferably a partial structure containing one or more (meth)acryloyl groups, (meth)acryloyloxy groups, (meth)acrylamide groups, or vinyl groups or two or more hydroxy groups, amino groups, or isocyanate groups, and particularly preferably a partial structure containing a (meth)acryloyl group or a (meth)acryloyloxy group.

Examples of $P^2$ include groups that do condensation polymerization such as a hydroxy group, an amino group, a carboxy group, an isocyanate group, and a dicarboxylic acid anhydride. Among these, a hydroxy group, an amino group, an isocyanate group, and a dicarboxylic acid anhydride are preferred, and a hydroxy group, an amino group, or an isocyanate group are particularly preferred.

$L^1$-$P^1$ is preferably a group represented by General Formula (F-1).

(F-1)

In the compound represented by General Formula (D), it is preferable that d1 is 1 to 4 and $R^{D1}$ is the group represented by General Formula (F-1), and it is more preferable that d1 is 1 and $R^{D1}$ is the group represented by General Formula (F-1). In General Formula (1), at least four of $R^{11}$ to $R^{16}$, $X^1$, and $X^2$ are preferably the group represented by General Formula (F-1), and at least one thereof is more preferably the group represented by General Formula (F-1).

In General Formula (2), at least four of $R^{21}$, $R^{22}$, $R^{23}$, and $R^{24}$ are preferably the group represented by General Formula (F-1), and at least one thereof is more preferably the group represented by General Formula (F-1).

$x^{31}$ represents —O— or >NH.

In the formula, $R^{31}$ represents a hydrogen atom, a hydroxy group, a cyano group, a halogen atom, an alkyl group, an alkenyl group, an alkynyl group, or an aryl group.

The alkyl group that can be used as $R^{31}$ is not particularly limited, but is preferably an alkyl group having 1 to 24 carbon atoms, more preferably an alkyl group having 1 to 12 carbon atoms, and particularly preferably an alkyl group having 1 to 6 carbon atoms.

The alkenyl group that can be used as $R^{31}$ is not particularly limited, but is preferably an alkenyl group having 2 to 24 carbon atoms, more preferably an alkenyl group having 2 to 12 carbon atoms, and particularly preferably an alkenyl group having 2 to 6 carbon atoms.

The alkynyl group that can be used as $R^{31}$ is not particularly limited, but is preferably an alkynyl group having 2 to 24 carbon atoms, more preferably an alkynyl group having 2 to 12 carbon atoms, and particularly preferably an alkynyl group having 2 to 6 carbon atoms.

The aryl group that can be used as $R^{31}$ is not particularly limited, but is preferably an aryl group having 6 to 22 carbon atoms and more preferably an aryl group having 6 to 14 carbon atoms.

Examples of the halogen atom that can be used as $R^3$ include a fluorine atom, a chlorine atom, a bromine atom, and an iodine atom, and a fluorine atom, a chlorine atom, or a bromine atom is preferred.

Among them, $R^{31}$ is preferably a hydrogen atom or an alkyl group and more preferably a hydrogen atom or methyl.

In a case in which $R^{31}$ is a group that may have a substituent (an alkyl group, an alkenyl group, an alkynyl group, or an aryl group), $R^{31}$ may further have another substituent. The examples of the substituent include the substituent Z. Among them, a halogen atom (a fluorine atom or the like), a hydroxy group, a carboxy group, an ester group, and an amide group are preferred.

$L^{31}$ is identical to $L^1$. Among them, an alkylene group (preferably having 1 to 12 carbon atoms and more preferably having 1 to 6 carbon atoms), a carbonyl group, an ether group, an imino group, or a linking group made of a combination thereof is more preferred. An alkylene group having 1 to 4 carbon atoms, a carbonyl group, an ether group, an imino group or a linking group made of a combination thereof is particularly preferred.

In a case in which $L^{31}$ is a group that may have a substituent, $L^{31}$ may further have another substituent. The examples of the substituent include the substituent T, and, among them, a halogen atom (a fluorine atom or a chlorine atom), an alkyl group, an acyl group, a carbamoyl group, and a hydroxy group are preferred.

$L^{31}$ preferably has a length of a certain value or more. The number of the shortest atoms that link the ring α (the ring α, among atoms constituting the ring structure in General Formula (1) or (2), an atom that $L^1$ bonds) and $X^{31}$ is identical to the number of the shortest atoms that link the ring α and $P^1$.

Hereinafter, examples of the compound having a ring structure of two or more rings will be illustrated, but the present invention is not interpreted to be limited by them. Meanwhile, in compounds exemplified below, m4 represents 1 to 100,000, and n4 represents 1 to 100,000.

B-1

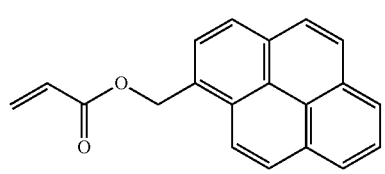

B-2

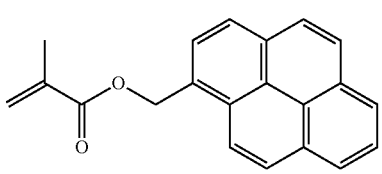

B-3

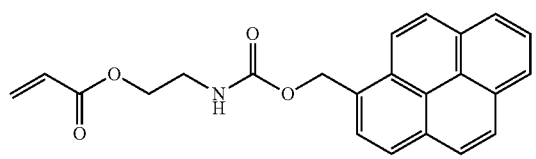

B-4

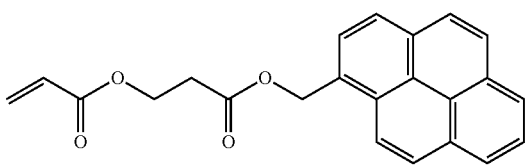

B-5

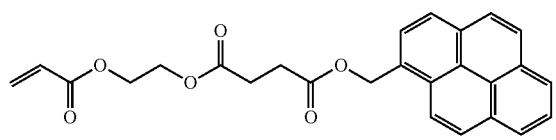

B-6

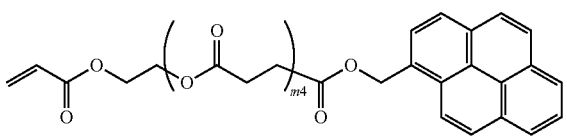

B-7

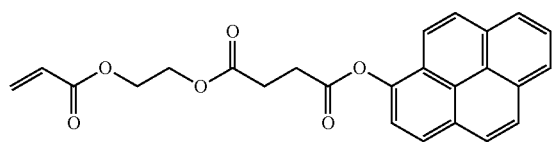

B-8

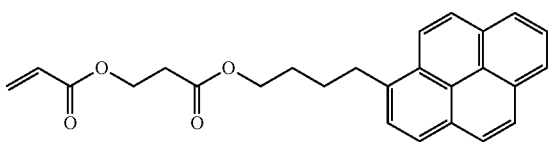

-continued
B-9
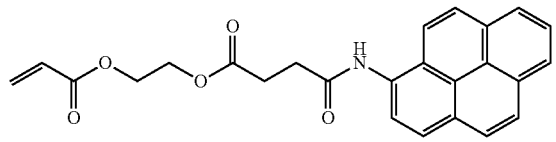
B-10
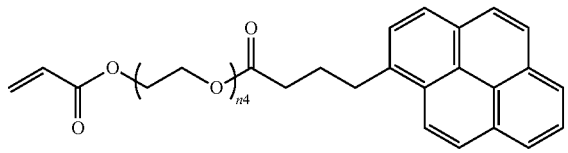
B-11
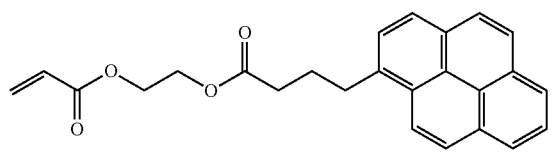
B-12
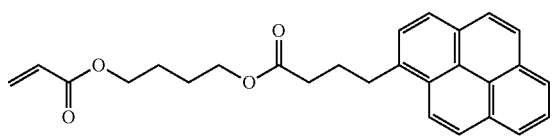
B-13
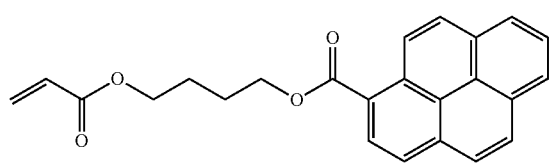
B-14
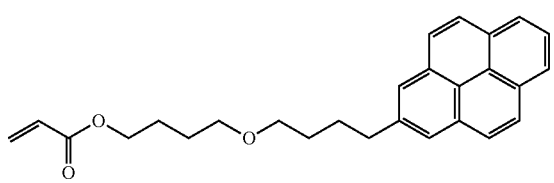
B-15
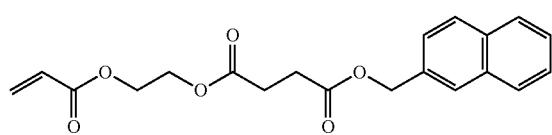
B-16
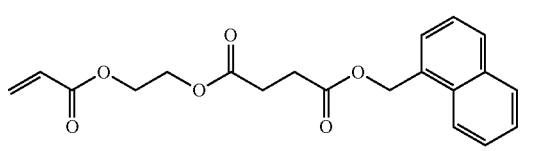
B-17
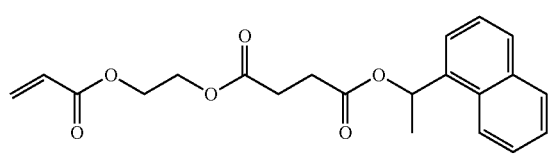
B-18
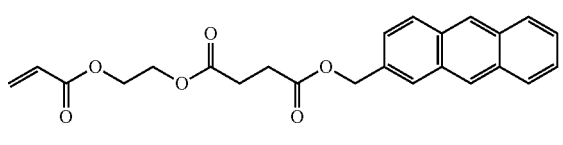
B-19
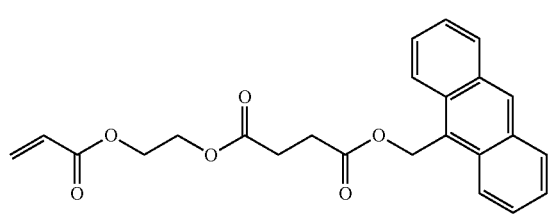
B-20
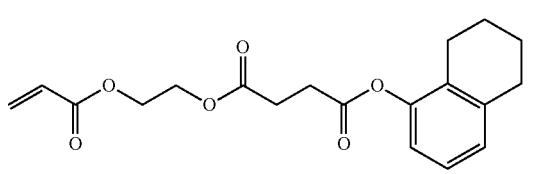
B-21
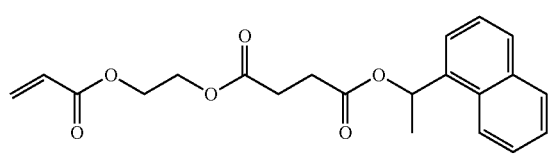
B-22
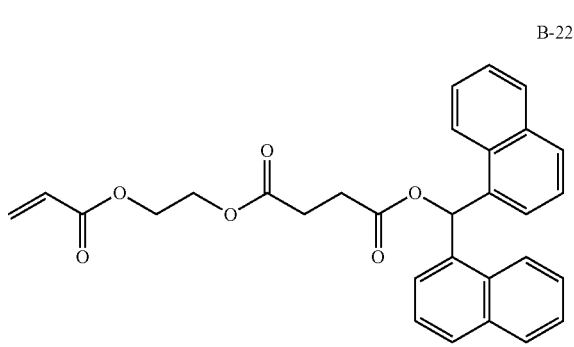

-continued
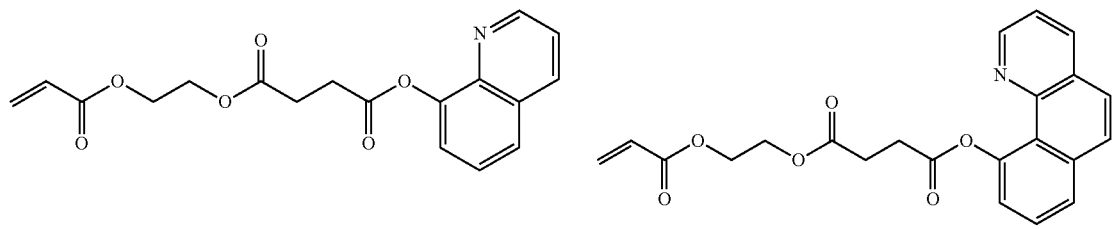
B-23
B-24
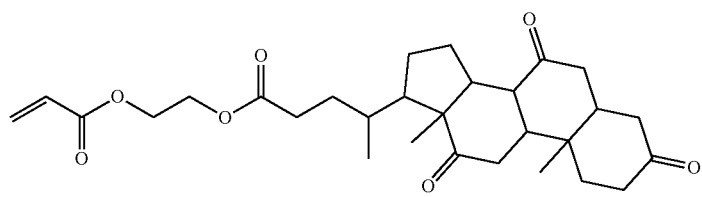
B-25
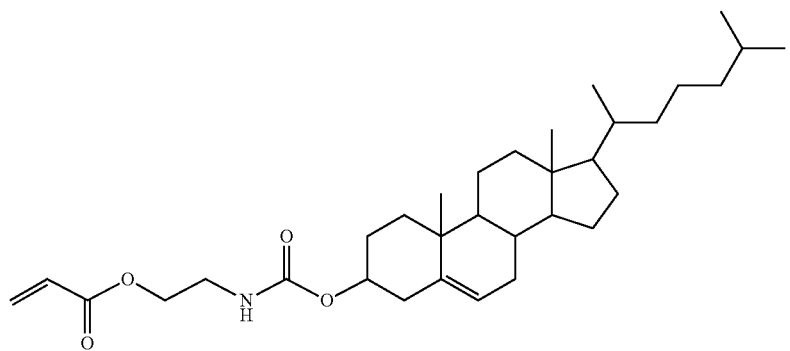
B-26
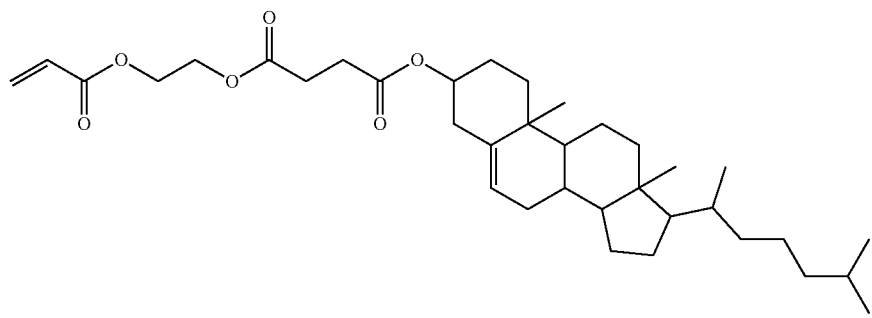
B-27
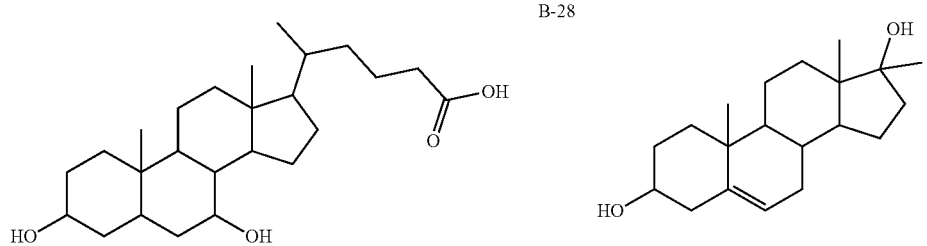
B-28
B-29

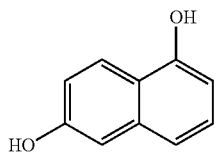
B-30

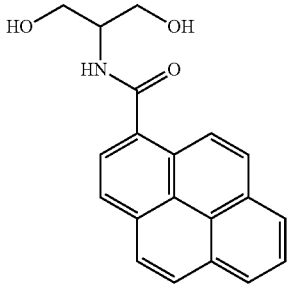
B-31

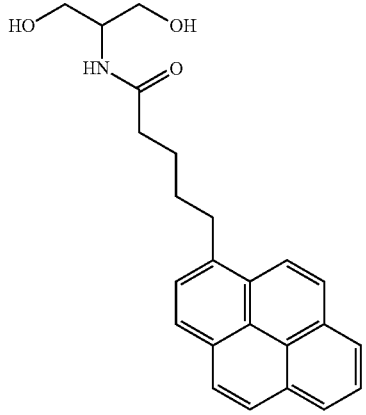
B-32

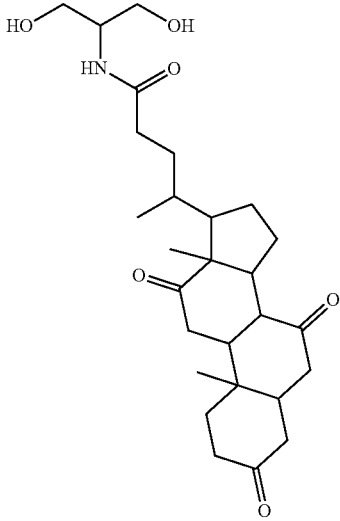
B-33

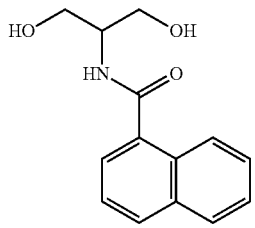
B-34

The compound having a ring structure of two or more rings can be synthesized by, for example, reacting a compound having a polymerizable group (for example, a (meth) acryloyl group or the like) with a compound having a reaction point with a ring structure of two or more rings (for example, a hydroxy group, a carboxy group, or the like).

The average particle diameter of the binder particles is 50,000 nm or less, preferably 1,000 nm or less, more preferably 500 nm or less, still more preferably 300 nm or less, and particularly preferably 250 nm or less. The lower limit value is 10 nm or more, preferably 30 nm or more, more preferably 50 nm or more, and particularly preferably 100 nm or more. In a case in which the size of the binder particles is set in the above-described range, the area of a resistance coating with the solid particles and the like becomes small, and it is possible to decrease the resistance. That is, it is possible to realize favorable adhesiveness and the suppression of interface resistance.

In the present invention, the average particle diameter of the binder particles refers to the average particle diameter in a state of encompassing the ion-conductive substance.

Unless particularly otherwise described, the average particle diameter of the binder particles refers to an average particle diameter according to measurement conditions and a definition described below.

One percent by mass of a dispersion liquid is diluted and prepared using the binder particles and an appropriate solvent (an organic solvent that is used to prepare the solid electrolyte composition, for example, heptane) in a 20 mL sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is considered as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, in a case in which the all-solid state secondary battery is used, the average particle diameter can be measured by, for example, disassembling the all-solid state secondary battery, peeling the active material layer or the solid electrolyte layer, measuring the average particle diameter of the material according to the above-described method for measuring the average particle diameter of the binder particles, and subtracting the measurement values of the average particle diameters of particles other than the binder particles which have been measured in advance.

The mass-average molecular weight of the polymer forming the binder particles is preferably 5,000 or more, more preferably 10,000 or more, and still more preferably 30,000 or more. The upper limit is practically 1,000,000 or less, but a crosslinked aspect is also preferred.

—Measurement of Molecular Weight—

In the present invention, unless particularly otherwise described, the molecular weight of the polymer refers to the mass-average molecular weight, and the standard polystyrene-equivalent mass-average molecular weight is measured by means of gel permeation chromatography (GPC). Regarding the measurement method, basically, a value measured using a method under the following condition 1 or 2 (preferential) is used. Here, an appropriate eluent may be appropriately selected and used depending on the kind of the polymer.

(Condition 1)

Column: Two TOSOH TSKgel Super AWM-H are connected together

Carrier: 10 mM LiBr/N-methylpyrrolidone

Measurement temperature: 40° C.

Carrier flow rate: 1.0 mL/min

Specimen concentration: 0.1% by mass

Detector: Refractive index (RI) detector (Condition 2) (preferential)

Column: A column obtained by connecting TOSOH TSKgel Super HZM-H, TOSOH TSKgel Super HZ4000, and TOSOH TSKgel Super HZ 2000 is used Carrier: Tetrahydrofuran Measurement temperature: 40° C.

Carrier flow rate: 1.0 mL/min

Specimen concentration: 0.1% by mass

Detector: Refractive index (RI) detector

In a case in which the polymer is crosslinked by heating or the application of voltage, the molecular weight may be greater than the above-described molecular weight. The mass-average molecular weight of the polymer forming the binder particles is preferably in the above-described range at the time of initiating the use of the all-solid state secondary battery.

The polymer constituting the binder particles that are used in the present invention preferably has a moisture concentration of 100 ppm or less (mass-based).

In addition, the polymer constituting the binder particles that are used in the present invention may be dried by being crystallized or may be used in a polymer solution form. The amount of a metal-based catalyst (a urethanization or polyesterification catalyst=tin, titanium, or bismuth) is preferably small. The concentration of metal in copolymers is preferably set to 100 ppm or less (mass-based) by decreasing the amount of the metal during polymerization or removing the catalyst by means of crystallization.

The content of the binder particles in the solid electrolyte composition is preferably 0.1% by mass or more, more preferably 0.3% by mass or more, and particularly preferably 1% by mass or more in the solid content. The upper limit is preferably 20% by mass or less, more preferably 10% by mass or less, and particularly preferably 5% by mass or less.

In a case in which the binder particles are used in the above-described range, it is possible to more efficiently realize both the fixing property of the solid electrolyte and the suppression of the interface resistance.

In the present invention, one kind of the binder particles may be used singly or a plurality of kinds of the binder particles may be used in combination. In addition, the binder particles may be used after being combined with a different kind of particles.

Meanwhile, the binder particles that are used in the present invention can be prepared using an ordinary method.

In addition, examples of a method for producing particles include a method in which the binder particles are formed during a polymerization reaction, a method in which a polymer solution is precipitated and particles are produced, and the like.

(Dispersion Medium)

The solid electrolyte composition of the present invention may further contain a dispersion medium.

The dispersion medium needs to be capable of dispersing the respective components described above, and examples thereof include a variety of organic solvents. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane (including each of 1,2-, 1,3- and 1,4-isomers)).

Examples of amide compound solvents include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, isobutyronitrile, and the like.

Examples of ester compound solvents include ethyl acetate, butyl acetate, propyl acetate, butyl butyrate, butyl pentanoate, and the like.

Examples of non-aqueous dispersion media include the aromatic compound solvents, the aliphatic compound solvents, and the like.

In the present invention, among these, the amino compound solvents, the ether compound solvents, the ketone compound solvents, the aromatic compound solvents, and the aliphatic compound solvents are preferred, and the ether compound solvents, the aromatic compound solvents, and the aliphatic compound solvents are more preferred. In the present invention, it is preferable to use a sulfide-based inorganic solid electrolyte and, furthermore, select a specific organic solvent described above. In the case of selecting this combination, the organic solvent does not include any functional groups that are active to the sulfide-based inorganic solid electrolyte, and thus the sulfide-based inorganic solid electrolyte is stably handled, which is preferable. Particularly, a combination of the sulfide-based inorganic solid electrolyte and the aliphatic compound solvent (preferably heptane) is preferred.

The dispersion medium may be used singly or two or more dispersion media may be used in combination.

In the present invention, the content of the dispersion medium in the solid electrolyte composition can be appropriately set in consideration of the balance between the viscosity of the solid electrolyte composition and the drying load. The content of the dispersion medium in the solid electrolyte composition is generally preferably 20% to 99% by mass, more preferably 25% to 85% by mass, and particularly preferably 30% to 80% by mass.

(Active Material)

The solid electrolyte composition of the present invention may contain an active material capable of intercalating and deintercalating ions of metal elements belonging to Group I or II of the periodic table. Examples of the active material include a positive electrode active material and a negative electrode active material which will be described below.

In the present invention, the solid electrolyte composition containing an active material (a positive electrode active material or a negative electrode active material) will be referred to as a composition for an electrode layer (a composition for a positive electrode or a composition for a negative electrode) in some cases.

The solid electrolyte composition of the present invention is preferably a composition for a negative electrode layer.

—Positive Electrode Active Material—

A positive electrode active material that the solid electrolyte composition of the present invention may contain is preferably a positive electrode active material capable of reversibly intercalating and deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (Ia), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, and cobalt fluorophosphates such as $Li_2CoPO_4F$.

Examples of the lithium-containing transition metal silicon acid compounds (ME) include $Li_2FeSiO_4$, $Li_2MnSiO_4$, $Li_2CoSiO_4$, and the like.

In the present invention, the transition metal oxides having a bedded salt-type structure (MA) are preferred, LCO or NMC is more preferred, and NMC is particularly preferred.

The shape of the positive electrode active material is not particularly limited, but is preferably particulate. The volume-average particle diameter (circle-equivalent average particle diameter) of the positive electrode active material is not particularly limited. For example, it is possible to set the volume-average particle diameter to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming the positive electrode active material layer, the mass (mg) of the positive electrode active material per unit area ($cm^2$) of the positive electrode active material layer (weight per unit area) is not particularly limited, and can be appropriately determined depending on the set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 70% to 80% by mass with respect to 100% by mass of the solid contents in the composition for a positive electrode.

—Negative Electrode Active Material—

A negative electrode active material that the solid electrolyte composition of the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or lithium complex oxides are preferably used in terms of reliability, and carbonaceous materials are more preferred. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially made of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, planar graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a $2\theta$ value in a range of 20° to 40° in an X-ray diffraction method in which CuKα rays are used and may have crystalline diffraction lines. The highest intensity in the crystalline diffraction line appearing at the $2\theta$ value of 40° or more and 70° or less is preferably 100 times or less and more preferably five times or less of the diffraction line intensity at the peak of the broad scattering line appearing at the $2\theta$ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries.

In the present invention, LTO or a carbonaceous material is preferably used, and a carbonaceous material (preferably hard carbon or graphite and particularly preferably graphite) is more preferably used. Meanwhile, in the present invention, the carbonaceous material may be used singly or two or more carbonaceous materials may be used in combination.

The shape of the negative electrode active material is not particularly limited, but is preferably particulate. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method or from the mass ratio of powder before and after firing as a convenient method.

Preferred examples of negative electrode active materials that can be jointly used with the amorphous oxide negative electrode active material mainly including Sn, Si, or Ge include carbon materials capable of absorbing/emitting lithium ions or lithium metal, lithium, lithium alloys, and metal capable of forming an alloy with lithium.

In the present invention, a Si-based negative electrode is preferably applied. Generally, a Si negative electrode is capable of absorbing a larger number of Li ions than carbon negative electrodes (graphite, acetylene black, and the like). That is, the amount of Li ions absorbed per unit weight increases. Therefore, it is possible to increase the battery capacity. As a result, there is an advantage that the driving time of batteries can be extended.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 80% by mass, more preferably 20% to 80% by mass, more preferably 30% to 80% by mass, and still more preferably 40% to 75% by mass with respect to 100% by mass of the solid contents.

(Auxiliary Conductive Agent)

The solid electrolyte composition of the present invention may also appropriately contain an auxiliary conductive agent that is used to improve the electron conductivity of the active materials as necessary. As the auxiliary conductive agent, ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene, all of which are electron-conductive materials, or may be metal powder or a metal fiber of copper, nickel, or the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

In a case in which the solid electrolyte composition of the present invention includes the auxiliary conductive agent, the content of the auxiliary conductive agent in the solid electrolyte composition is preferably 0% to 10% by mass.

(Lithium Salt)

The solid electrolyte composition for an all-solid state secondary battery of the present invention preferably contains a lithium salt.

The lithium salt is preferably a lithium salt that is ordinarily used in this kind of products and is not particularly limited. Examples thereof include LiTFSI and the lithium salts described in Paragraphs 0082 to 0085 of JP2015-088486A. In the present invention, LiTFSI is preferably used.

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Dispersant)

The solid electrolyte composition of the present invention may contain a dispersant. In a case in which the dispersant is added to the solid electrolyte composition, it is possible to suppress the agglomeration of the electrode active material or the inorganic solid electrolyte and form a uniform active material layer and a uniform solid electrolyte layer even in a case in which the concentration of any of the electrode active material or the inorganic solid electrolyte is high.

As the dispersant, a dispersant that is ordinarily used in all-solid state secondary batteries can be appropriately selected and used. For example, a dispersant which is made of a low-molecular-weight molecule or an oligomer having a molecular weight of 200 or more and less than 3,000 and contains a functional group represented by a group of functional groups (I) and an alkyl group having 8 or more carbon atoms or an aryl group having 10 or more carbon atoms in the same molecule is preferred.

Group of functional groups (I): an acidic group, a group having a basic nitrogen atom, a (meth)acryl group, a (meth)acrylamide group, an alkoxysilyl group, an epoxy group, an oxetanyl group, an isocyanate group, a cyano group, a mercapto group, and a hydroxy group (an acidic group, a group having a basic nitrogen atom, an alkoxysilyl group, an epoxy group, an oxetanyl group, a cyano group, a mercapto group, and a hydroxy group are preferred, and a carboxy group, a sulfonic acid group, a cyano group, an amino group, and a hydroxy group are more preferred).

In a case in which there is a layer including the dispersant in the all-solid state secondary battery of the present invention, the content of the dispersant in the layer is preferably 0.2% to 10% by mass.

(Preparation of Solid Electrolyte Composition)

The solid electrolyte composition of the present invention can be manufactured by mixing or adding the inorganic solid electrolyte, the binder particles, and, as necessary, other components such as the dispersion medium. For example, the solid electrolyte composition can be produced by mixing the above-described components using a variety of mixers. The mixing conditions are not particularly limited, and examples thereof include a ball mill, a bead mill, a planetary mixer, a blade mixer, a roll mill, a kneader, a disc mill, and the like.

[Sheet for All-Solid State Secondary Battery]

A sheet for an all-solid state secondary battery of the present invention may be a sheet that is used for all-solid state secondary batteries and includes a variety of aspects depending on the use. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, there are cases in which a variety of sheets described above will be collectively referred to as the sheet for an all-solid state secondary battery.

The sheet for an all-solid state secondary battery of the present invention is a sheet having a solid electrolyte layer or an active material (an electrode layer) on a base material. This sheet for an all-solid state secondary battery may have other layers as long as the sheet has a base material and a solid electrolyte layer or an active material, and a sheet having an active material layer is classified as an electrode sheet for an all-solid state secondary battery described below. Examples of other layers include a protective layer, a collector, a coating layer (a collector, another solid electrolyte layer, or another active material), and the like.

Examples of the solid electrolyte sheet for an all-solid state secondary battery of the present invention include a sheet having a solid electrolyte layer and, as necessary, a protective layer in this order on a base material which is intended to form the solid electrolyte layer of the all-solid state secondary battery of the present invention.

The base material is not particularly limited as long as the base material is capable of supporting the solid electrolyte layer, and examples thereof include sheet bodies (plate-like bodies) of the materials, the organic materials, the inorganic materials, and the like which have been described in the section of the collector. Examples of the organic materials include a variety of polymers, and specific examples thereof include polyethylene terephthalate, polypropylene, polyethylene, cellulose, and the like. Examples of the inorganic materials include glass, ceramic, and the like. In addition, in a case in which the base material is porous, the solid electrolyte layer may be produced by impregnating the solid electrolyte composition in the support.

The constitution and the layer thickness of the solid electrolyte layer in the sheet for an all-solid state secondary battery are the same as the constitution and the layer thickness of the solid electrolyte layer described in the section of the all-solid state secondary battery of the present invention.

This sheet is obtained by forming a film of the solid electrolyte composition of the present invention on a base material (possibly, through other layers) (by means of coating and drying) and forming a solid electrolyte layer on the base material.

Here, the solid electrolyte composition of the present invention can be prepared using the above-described method.

The electrode sheet for an all-solid state secondary battery of the present invention (also simply referred to as "the electrode sheet of the present invention") is an electrode sheet having an active material layer on a metal foil as a collector which is intended to form the active material layer of the all-solid state secondary battery of the present invention. This electrode sheet is generally a sheet having a collector and an active material layer, but may be an aspect having a collector, an active material layer, and a solid electrolyte layer in this order or an aspect having a collector, an active material layer, a solid electrolyte layer, and an active material layer in this order.

The constitutions and the layer thicknesses of the respective layers constituting the electrode sheet are the same as the constitutions and the layer thicknesses of the respective layers described in the section of the all-solid state secondary battery of the present invention.

The electrode sheet is obtained by forming a film of the solid electrolyte composition of the present invention which contains an active material on a metal foil (by means of coating and drying) and forming an active material layer on the metal foil.

[Manufacturing of all-Solid State Secondary Battery and Electrode Sheet for all-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the present invention and the like. The details will be described below.

The all-solid state secondary battery of the present invention can be manufactured using a method including (through) a step of applying the solid electrolyte composition of the present invention onto a metal foil which serves as a collector and forming a coated film (film manufacturing).

For example, a solid electrolyte composition containing a positive electrode active material is applied as a material for a positive electrode (a composition for a positive electrode layer) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode layer) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode layer) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied so as to form multiple layers. The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent general performance is exhibited, and it is possible to obtain a favorable bonding property and a favorable ion conductivity even without pressurization.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte. Meanwhile, in a case in which the inorganic solid electrolyte and the binder particles coexist, the respective layers or the all-solid state secondary battery can also be pressed at a temperature higher than the glass transition temperature of the polymer forming the binder particles. However, generally, the pressing temperature is a temperature that does not exceed the melting point of the polymer.

The pressurization may be carried out in a state in which the applied solvent or dispersion medium has been dried in advance or in a state in which the solvent or the dispersion medium remains.

The atmosphere during the pressurization is not particularly limited and may be any one of under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to apply different pressures to the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then decreasing the pressure up to a pressure at which the all-solid state secondary battery is ordinarily used.

[Uses of all-Solid State Secondary Battery]

The all-solid state secondary battery of the present invention can be applied to a variety of uses. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer uses include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military uses and universe uses. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic uses in which batteries are charged out every day, better safety is required against overcharging. According to the present invention, it is possible to preferably cope with the above-described use aspects and exhibit excellent effects.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S, LLT, LLZ, or the like is used. Meanwhile, the application of polymer compounds to inorganic all-solid state secondary batteries is not inhibited, and polymer compounds can also be applied as positive electrode active materials, negative electrode active materials, and binder particles of inorganic solid electrolyte particles.

Inorganic solid electrolytes are differentiated from electrolytes in which the above-described polymer compound such as polyethylene oxide is used as an ion conductive medium (polymer electrolyte), and inorganic compounds serve as ion conductive media. Specific examples thereof include the Li—P—S, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the case of being referred to as a "composition" in the present invention, the "composition" refers to a mixture obtained by uniformly mixing two or more components. Here, the composition needs to substantially maintain uniformity and may partially include agglomeration or uneven distribution as long as the compositions exhibit desired effects. In addition, in the case of being referred to as a solid electrolyte composition, the solid electrolyte composition basically refers to a composition (typically having a paste form) which serves as a material for forming the solid electrolyte layer or the like, and an electrolyte layer or the like formed by curing the above-described composition is not considered as the solid electrolyte composition.

EXAMPLES

Hereinafter, the present invention will be described in more detail on the basis of examples. Meanwhile, the present invention is not interpreted to be limited thereto. In the following examples, "parts" and "%" expressing compositions are mass-based unless particularly otherwise described.

Meanwhile, the symbol "-" that is used in tables represents the fact that the corresponding component is not contained in the composition of the corresponding example. In addition, "room temperature" refers to 25° C.

EXAMPLES AND COMPARATIVE EXAMPLES

Synthesis examples of components that were used in examples and comparative examples below will be described.

<Synthesis of Binder Particles (Preparation of Binder Particle Dispersion)>

(1-1) Synthesis of Binder Particles BP-1

Heptane (200 parts by mass) was added to a 1 L three-neck flask equipped with a reflux cooling pipe and a gas introduction cock, nitrogen gas was introduced into the flask at a flow rate of 200 mL/min for 10 minutes, and heptane was heated to 80° C. from room temperature. A liquid prepared in a separate container (a liquid obtained by mixing butyl acrylate A-5 (manufactured by Wako Pure Chemical Industries, Ltd.) (90 parts by mass), methyl methacrylate A-4 (manufactured by Wako Pure Chemical Industries, Ltd.) (20 parts by mass), acrylic acid A-1 (manufactured by Wako Pure Chemical Industries, Ltd.) (10 parts by mass), B-16 (synthesized product) (20 parts by mass), the macromonomer MM-L (60 parts by mass in terms of the solid content amount), and a polymerization initiator V-601 (trade name, manufactured by Wako Pure Chemical Industries, Ltd.) (2.0 parts by mass)) was added dropwise to heptane under stirring for two hours and then the components were stirred at 80° C. for two hours. After that, V-601 (1.0 part by mass) was further added to the obtained mixture, and the components were stirred at 90° C. for two hours. The obtained solution was diluted with heptane, thereby obtaining a dispersion liquid of binder particles BP-1.

Dispersion liquids of binder particles BP-2 to BP-10 were respectively prepared in the same manner as in the preparation of the dispersion liquid of binder particles BP-1 except for the fact that the compositions were changed as shown in Table 1.

(Synthesis of B-16)

1-Naphthalene dimethanol (manufactured by Tokyo Chemical Industry Co., Ltd.) (33 g), mono(2-acryloyloxyethyl) succinate (manufactured by Aldrich-Sigma, Co. LLC.) (50 g), 4-dimethylaminopyridine (manufactured by Tokyo Chemical Industry Co., Ltd.) (5 g), and dichloromethane (500 g) were added to a 1 L three-neck flask and then stirred at 20° C. for five minutes. 1-(3-Dimethylaminopropyl)-3-ethylcarbondiimide hydrochloride (manufactured by Tokyo Chemical Industry Co., Ltd.) (52 g) was added to the solution under stirring for 30 minutes and stirred at 20° C. for five hours. After that, the solution was washed with 0.1 M hydrochloric acid three times, dried with magnesium sulfate, and distilled away under reduced pressure. The obtained sample was purified by means of silica gel column chromatography, thereby obtaining B-16.

(Synthesis of Macromonomer MM-1)

Toluene (190 parts by mass) was added to a 1 L three-neck flask equipped with a reflux cooling pipe and a gas introduction cock, nitrogen gas was introduced into the flask at a flow rate of 200 mL/min for 10 minutes, and toluene was heated to 80° C. from room temperature. A liquid prepared in a separate container (the following formulation α) was added dropwise to toluene under stirring for two hours, and then the components were stirred at 80° C. for two hours. After that, V-601 (manufactured by Wako Pure Chemical Industries, Ltd.) (0.2 parts by mass) was added thereto, and furthermore, the components were stirred at 95° C. for two hours. 2,2,6,6,-Tetramethyl piperidine-1-oxyl (manufactured by Tokyo Chemical Industry Co., Ltd.) (0.025 parts by mass), glycidyl methacrylate (manufactured by Wako Pure Chemical Industries, Ltd.) (13 parts by mass), and tetrabutyl ammonium bromide (manufactured by Tokyo Chemical Industry Co., Ltd.) (2.5 parts by mass) were added to the solution held at 95° C. after stirring and stirred at 120° C. for three hours. The obtained mixture was cooled to room temperature, added to methanol, and precipitated, the precipitate was filtered, washed with methanol twice, and then heptane (300 parts by mass) was added to the precipitate and dissolved the precipitate. The obtained solution was condensed at a reduced pressure, thereby obtaining a solution of the macromonomer MM-1. The concentration of the solid content was 43.4%, the SP value was 9.1, and the mass-average molecular weight was 16,000. The obtained macromonomer MM-1 will be illustrated below.

(Formulation α)

| | |
|---|---|
| Dodecyl methacrylate (manufactured by Wako Pure Chemical Industries, Ltd.) | 150 parts by mass |
| Methyl methacrylate A-4 (manufactured by Wako Pure Chemical Industries, Ltd.) | 59 parts by mass |
| 3-Mercaptoisobutyric acid (manufactured by Tokyo Chemical Industry Co., Ltd.) | 2 parts by mass |
| V-601 (manufactured by Wako Pure Chemical Industries, Ltd.) | 1.9 parts by mass |

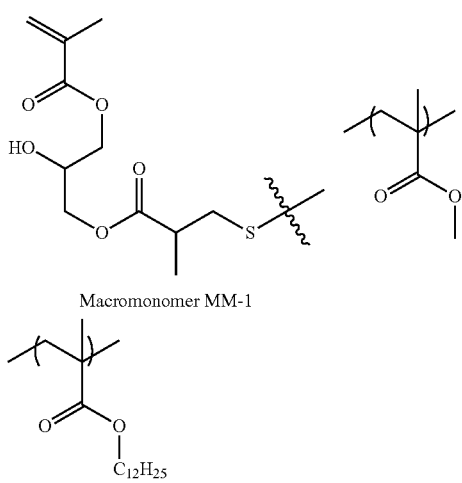

Macromonomer MM-1

Hereinafter, methods for synthesizing B-5, B-7, B-9, B-12, B-21, and B-27 which were used in the examples will be described.

(Synthesis of B-5)

B-5 was synthesized in the same manner as B-16 except for the fact that 1-naphthalene methanol (33 g) was changed to 1-pyrenemethanol (manufactured by Tokyo Chemical Industry Co., Ltd.) (48 g).

(Synthesis of B-7)

B-7 was synthesized in the same manner as B-16 except for the fact that 1-naphthalene methanol (33 g) was changed to 1-hydroxypyrene (manufactured by Tokyo Chemical Industry Co., Ltd.) (46 g).

(Synthesis of B-9)

B-9 was synthesized in the same manner as B-16 except for the fact that 1-naphthalene methanol (33 g) was changed to 1-aminopyrene (manufactured by Tokyo Chemical Industry Co., Ltd.) (46 g).

(Synthesis of B-12)

B-12 was synthesized in the same manner as B-16 except for the fact that 1-naphthalene methanol (33 g) and mono (2-acryloyloxyethyl) succinate (50 g) were respectively changed to 1-pyrenebutyric acid (60 g) and 4-hydroxybutyl acrylate (33 g).

(Synthesis of B-21)

B-21 was synthesized in the same manner as B-16 except for the fact that 1-naphthalene methanol (33 g) was changed to decahydro-2-naphthol (manufactured by Tokyo Chemical Industry Co., Ltd.) (32 g).

(Synthesis of B-27)

B-27 was synthesized in the same manner as B-16 except for the fact that 1-naphthalene methanol (33 g) was changed to a cholesterol (manufactured by Tokyo Chemical Industry Co., Ltd.) (80 g).

Hereinafter, a method for synthesizing a macromonomer MM-2 used in the examples will be described.

(Synthesis of Macromonomer MM-2)

Toluene (190 parts by mass) was added to a 1 L three-neck flask equipped with a reflux cooling pipe and a gas introduction cock, nitrogen gas was introduced into the flask at a flow rate of 200 mL/min for 10 minutes, and toluene was heated from room temperature to 80° C. A liquid prepared in a separate container (the following formulation α) was added dropwise thereto for two hours, and then the components were stirred at 80° C. for two hours. After that, V-601 (0.2 parts by mass) was added thereto, and furthermore, the components were stirred at 95° C. for two hours. 2,2,6,6,-Tetramethyl piperidine-1-oxyl (manufactured by Tokyo Chemical Industry Co., Ltd.) (0.025 parts by mass), 2-isocyanatoethyl methacrylate (manufactured by Wako Pure Chemical Industries, Ltd.) (13 parts by mass), and a bismuth catalyst: NEOSTAN U-600 (trade name, manufactured by Nitto Kasei Co., Ltd.) (0.6 parts by mass) were added to the solution held at 95° C. after stirring and stirred at 95° C. for three hours. The obtained mixture was cooled to room temperature, added to methanol, and precipitated, the precipitate was filtered, then, washed with methanol twice, and then heptane (300 parts by mass) was added to the precipitate and dissolved the precipitate. The obtained solution was condensed at a reduced pressure, thereby obtaining a solution of the macromonomer MM-2. The concentration of the solid content was 40.2%, the SP value was 9.1, and the mass-average molecular weight was 11,000. The obtained macromonomer MM-2 will be illustrated below.

(Formulation β)

| | |
|---|---|
| Dodecyl methacrylate (manufactured by Wako Pure Chemical Industries, Ltd.) | 150 parts by mass |
| B-5 (synthesized product) | 59 parts by mass |
| 6-Mercapto-1-hexanol (manufactured by Tokyo Chemical Industry Co., Ltd.) | 2 parts by mass |
| V-601 (manufactured by Wako Pure Chemical Industries, Ltd.) | 1.9 parts by mass |

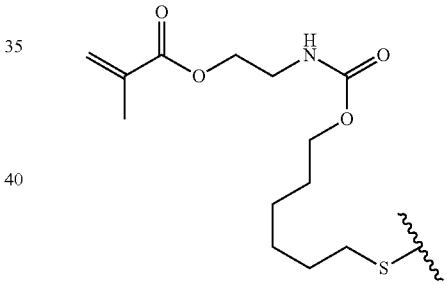

Macromonomer MM-2

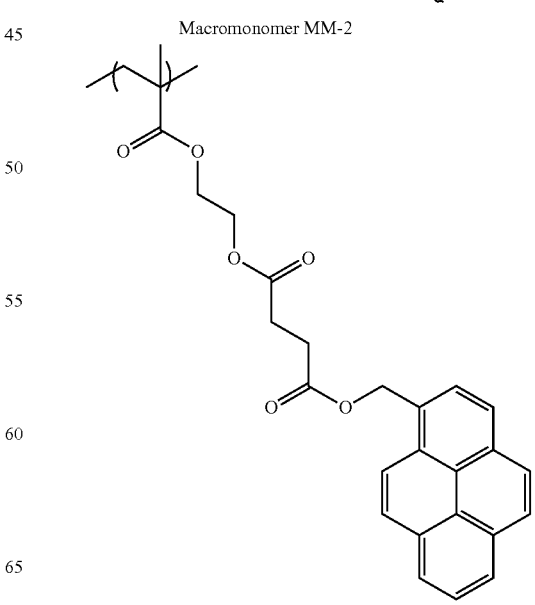

-continued

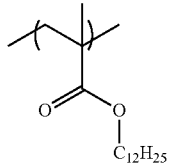

(Synthesis of Binder Particles BP-11 Made of Urethane Resin)

In order to synthesize binder particles BP-11 made of a urethane resin, first, terminal diol polydodecyl methacrylate was synthesized. Hereinafter, the order will be described.

Methyl ethyl ketone (20 mL) was prepared in a 500 mL three-neck flask and heated to 75° C. under a nitrogen stream. Meanwhile, dodecyl methacrylate (manufactured by Wako Pure Chemical Industries, Ltd.) (70 g) and methyl ethyl ketone (110 g) were prepared in a 500 mL measuring cylinder and stirred for 10 minutes at room temperature. Thioglycerol (manufactured by Wako Pure Chemical Industries, Ltd.) (2.9 g) as a chain transfer agent and a radical polymerization initiator V-601 (manufactured by Wako Pure Chemical Industries, Ltd.) (3.2 g) were added to a 500 mL measuring cylinder and further stirred for 10 minutes. The obtained monomer solution was added dropwise to the 500 mL three-neck flask for two hours, and radical polymerization was initialized. Furthermore, after the dropwise addition, the components were heated and stirred at 75° C. for six hours. The obtained polymerized liquid was condensed at a reduced pressure, methyl ethyl ketone was distilled away, and then the solid content was dissolved in heptane, thereby obtaining a heptane solution of 25% by mass of terminal diol-modified polydodecyl methacrylate (292 g).

The mass-average molecular weight of the obtained polymer was 3,200.

Subsequently, polyurea colloid particles MM-3 were synthesized. Hereinafter, the order will be described.

The heptane solution of 25% by mass of terminal diol-modified polydodecyl methacrylate (260 g) was added to a 1 L three-neck flask and diluted with heptane (110 g). Isophoronediamine (manufactured by Wako Pure Chemical Industries, Ltd.) (11.1 g) and NEOSTAN U-600 (trade name, manufactured by Nitto Kasei Co., Ltd.) (0.1 g) were added thereto and heated and stirred at 75° C. for five hours. After that, a diluted liquid of isophorone diisocyanate (amine compound) (0.4 g) in heptane (125 g) was added dropwise thereto for one hour. Ten minutes after the initiation of the dropwise addition, the polymer solution changed from a transparent solution to a solution having a light yellow fluorescent color. From this change, it was confirmed that urea colloids were formed. The reaction liquid was cooled to room temperature, and a heptane solution of 15% by mass of polyurea colloid particles MM-3 (506 g) was obtained.

The polyurea colloid particles MM-3 has a polyurea SP value of 9.6 and a mass-average molecular weight of 9,600.

Next, a urethane resin BP-11 was synthesized using the polyurea colloid particles MM-3.

Specifically, 4,4'-diphenylmethane diisocyanate (manufactured by Tokyo Chemical Industry Co., Ltd.) (3.8 g), polyethylene glycol (mass-average molecular weight: 600, manufactured by Aldrich-Sigma, Co. LLC.) (5.2 g), and B-30 (1.0 g) were added to a 50 mL sample bottle. The heptane solution (20 g) of 15% by mass of polyurea colloid particles MM-3 was added thereto and dispersed for 30 minutes using a homogenizer while being heated at 50° C. During the addition and dispersion, the liquid mixture was microparticulated and turned into a light orange slurry. The obtained slurry was injected into a 200 mL three-neck flask heated at a temperature of 80° C. in advance, NEOSTAN U-600 (trade name, manufactured by Nitto Kasei Co., Ltd.) (0.1 g) was added thereto, heated and stirred at 80° C. for three hours at a rotation speed of 400 rpm. The slurry became a white emulsion form. Therefore, it was assumed that binder particles made of a urethane resin were formed. The white emulsion-form slurry was cooled, thereby obtaining a heptane dispersion liquid of binder particles BP-11 made of the urethane resin. The concentration of the solid content was 39.2%, and the mass-average molecular weight was 101,000.

Dispersion liquids of binder particles BP-12 and BP-13 were respectively prepared in the same manner as in the preparation of the binder particle BP-11 dispersion liquid except for the fact that the compositions were changed as shown in Table 1. The concentration of the solid content in BP-12 was 38.8%, and the concentration of the solid content in BP-13 was 39.5%.

<Synthesis of Binder Particles BPC-1 for Comparison>

Heptane (200 parts by mass) was added to a 1 L three-neck flask equipped with a reflux cooling pipe and a gas introduction cock, nitrogen gas was introduced thereinto at a flow rate of 200 mL/min for 10 minutes, and then heptane was heated to 80° C. A liquid prepared in a separate container (a liquid obtained by mixing butyl acrylate A-5 (manufactured by Wako Pure Chemical Industries, Ltd.) (90 parts by mass), methyl methacrylate A-4 (manufactured by Wako Pure Chemical Industries, Ltd.) (30 parts by mass), acrylic acid A-1 (manufactured by Wako Pure Chemical Industries, Ltd.) (10 parts by mass), B-16 (synthesized product) (20 parts by mass), a macromonomer MMC-1 (60 parts by mass in terms of the solid content amount), and a polymerization initiator V-601 (trade name, manufactured by Wako Pure Chemical Industries, Ltd.) (2.0 parts by mass)) was added dropwise thereto for two hours and then the components were stirred at 80° C. for two hours. After that, V-601 (1.0 part by mass) was further added to the obtained mixture, and the components were further stirred at 90° C. for two hours. The obtained solution was diluted with heptane, thereby obtaining a dispersion liquid of binder particles BPC-1.

(Synthesis of Macromonomer MMC-1)

Toluene (190 parts by mass) was added to a 1 L three-neck flask equipped with a reflux cooling pipe and a gas introduction cock, nitrogen gas was introduced thereinto at a flow rate of 200 mL/min for 10 minutes, and then toluene was heated 90° C. A liquid prepared in a separate container (the following formulation γ) was added dropwise to toluene under stirring for two hours, and then the components were stirred at 90° C. for two hours. After that, V-601 (manufactured by Wako Pure Chemical Industries, Ltd.) (0.2 parts by mass) was added thereto, and furthermore, the components were stirred at 100° C. for two hours. 2,2,6,6,-Tetramethyl piperidine-1-oxyl (manufactured by Tokyo Chemical Industry Co., Ltd.) (0.05 parts by mass), glycidyl methacrylate (manufactured by Wako Pure Chemical Industries, Ltd.) (100 parts by mass), and tetrabutyl ammonium bromide (manufactured by Tokyo Chemical Industry Co., Ltd.) (30 parts by mass) were added to the solution held at 100° C. after stirring and stirred at 120° C. for three hours. The obtained mixture was cooled to room temperature, added to methanol, and precipitated, the precipitate was filtered, washed with methanol twice, and then heptane (300 parts by mass) was added to the precipitate and dissolved the precipitate. The obtained solution was condensed at a reduced pressure, thereby obtaining a solution of the macromonomer MMC-1. The concentration of the solid content was 38.5%, the SP value was 9.5, and the mass-average molecular weight was 500.

(Formulation γ)

| | |
|---|---|
| Dodecyl methacrylate (manufactured by Wako Pure Chemical Industries, Ltd.) | 150 parts by mass |
| Methyl methacrylate A-4 (manufactured by Wako Pure Chemical Industries, Ltd.) | 59 parts by mass |
| 3-Mercaptoisobutyric acid (manufactured by Tokyo Chemical Industry Co., Ltd.) | 40 parts by mass |
| V-601 (manufactured by Wako Pure Chemical Industries, Ltd.) | 2.5 parts by mass | appropriate dispersion medium (a dispersion medium that was used to prepare the solid electrolyte composition; heptane in the case of the binder particles BP-1). This dispersion liquid specimen was irradiated with 1 kHz ultrasonic waves for 10 minutes, and then the volume-average particle diameter of resin particles was measured using a laser diffraction/scattering-type particle size distribution measurement instrument LA-920 (trade name, manufactured by Horiba Ltd.).

<Measurement of Mass-Average Molecular Weight>

The mass-average molecular weight of the macromonomer forming the binder particles was measured using the above-described method (Condition 2).

TABLE 1

| No. | M1 | % | M2 | % | M3 | % | M4 | % | MM | % | Average particle diameter of binder (nm) |
|---|---|---|---|---|---|---|---|---|---|---|---|
| BP-1 | A-5 | 45 | A-4 | 10 | A-1 | 5 | B-16 | 10 | MM-1 | 30 | 158 |
| BP-2 | A-5 | 45 | A-4 | 10 | A-1 | 5 | B-5 | 10 | MM-1 | 30 | 135 |
| BP-3 | A-5 | 37 | A-4 | 8 | A-1 | 5 | B-5 | 20 | MM-1 | 30 | 118 |
| BP-4 | A-5 | 50 | A-4 | 10 | — | — | B-5 | 10 | MM-1 | 30 | 125 |
| BP-5 | A-5 | 45 | A-4 | 10 | A-1 | 5 | B-5 | 10 | MM-2 | 30 | 115 |
| BP-6 | A-5 | 45 | A-4 | 10 | A-1 | 5 | B-7 | 10 | MM-1 | 30 | 142 |
| BP-7 | A-5 | 45 | A-4 | 10 | A-1 | 5 | B-9 | 10 | MM-1 | 30 | 153 |
| BP-8 | A-5 | 45 | A-4 | 10 | A-1 | 5 | B-12 | 10 | MM-1 | 30 | 118 |
| BP-9 | A-5 | 45 | A-4 | 10 | A-1 | 5 | B-21 | 10 | MM-1 | 30 | 186 |
| BP-10 | A-5 | 45 | A-4 | 10 | A-1 | 5 | B-27 | 10 | MM-1 | 30 | 128 |
| BP-11 | MDI | 27 | PEG | 36 | B-30 | 7 | — | — | MM-3 | 30 | 253 |
| BP-12 | MDI | 24 | PEG | 39 | B-34 | 7 | — | — | MM-3 | 30 | 274 |
| BP-13 | MDI | 22 | PEG | 41 | B-32 | 7 | — | — | MM-3 | 30 | 298 |
| BPC-1 | A-5 | 45 | A-4 | 15 | A-1 | 10 | — | — | MMC-1 | 30 | 188 |

<Notes of Table>
MDI: 4,4'-diphenylmethane diisocyanate (manufactured by Tokyo Chemical Industry Co., Ltd.)
PEG: Polyethylene glycol (manufactured by Aldrich-Sigma, Co. LLC., mass-average molecular weight: 600)
A-number: Compound exemplified above
B-number: Compound exemplified above —Measurement Methods—

<Method for Measuring Concentration of Solid Content>

The concentrations of the solid contents of the dispersion liquid of the binder particles and the macromonomer solution were measured on the basis of the following method.

The dispersion liquid of the binder particles or the macromonomer solution (approximately 1.5 g) was weighed in an aluminum cup having a diameter of 7 cm, and the weighing value was scanned to three places of decimals. Subsequently, the dispersion liquid or the macromonomer solution was heated and dried at 90° C. for two hours in a nitrogen atmosphere and continuously heated and dried at 140° C. for two hours. The mass of the obtained residue in the aluminum cup was measured, and the concentration of the solid content was computed from the following expression. The measurement was carried out five times, and the average value of three measurement values excluding the maximum value and the minimum value was employed.

The concentration of the solid content (%)=the amount (g) of the residue in the aluminum cup/ the dispersion liquid of the binder particles or the macromonomer solution (g)

<Measurement of Average Particle Diameter of Binder Particles>

The average particle diameter (PD) of the binder particles was measured in the following order. A dispersion liquid (1% by mass) of a dried specimen of the dispersion liquid of the binder particles prepared above was prepared using an <Synthesis of Sulfide-Based Inorganic Solid Electrolyte>

In a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were weighed respectively, injected into an agate mortar, and mixed together using an agate muddler for five minutes. The mixing ratio between $Li_2S$ and $P_2S_5$ was set to 75:25 ($Li_2S:P_2S_5$) in terms of molar ratio.

Zirconia beads having a diameter of 5 mm (66 g) were injected into a 45 mL zirconia container (manufactured by Fritsch Japan Co., Ltd.), the full amount of a mixture of the lithium sulfide and the diphosphorus pentasulfide was injected thereinto, and the container was completely sealed in the argon atmosphere. The container was set in a planetary ball mill P-7 (trade name, manufactured by Fritsch Japan Co., Ltd.), mechanical milling was carried out at a temperature of 25° C. and a rotation speed of 510 rpm for 20 hours, thereby obtaining yellow powder (6.20 g) of a sulfide-based inorganic solid electrolyte (Li/P/S glass, hereinafter, expressed as LPS in some cases).

A composition was prepared using the components synthesized above. In addition, an electrode sheet and a battery were produced. Hereinafter, a preparation method and a production method will be described. In addition, the evaluations of the composition, the electrode sheet, and the battery will be described.

<Example of Preparation of Solid Electrolyte Composition>

180 zirconia beads having a diameter of 5 mm were injected into a 45 mL zirconia container (manufactured by Fritsch Japan Co., Ltd.), and the above-synthesized LPS (4.85 g), the binder particles (0.15 g in terms of the solid content mass) shown in Table 2, and the dispersion medium (17.0 g) shown in Table 2 were injected thereinto. After that, the container was set in a planetary ball mill P-7 manufactured by Fritsch Japan Co., Ltd., the components were continuously mixed at a temperature of 25° C. and a rotation speed of 300 rpm for two hours, thereby preparing individual solid electrolyte compositions S-1 to S-13 and T-1.

TABLE 2

| No. | inorganic solid electrolyte | % | Binder particles | % | Dispersion medium | Note |
|---|---|---|---|---|---|---|
| S-1 | LPS | 97% | BP-1 | 3% | Heptane | Present Invention |
| S-2 | LPS | 97% | BP-2 | 3% | Heptane | Present Invention |
| S-3 | LPS | 97% | BP-3 | 3% | Heptane | Present Invention |
| S-4 | LPS | 97% | BP-4 | 3% | Heptane | Present Invention |
| S-5 | LPS | 97% | BP-5 | 3% | Heptane | Present Invention |
| S-6 | LPS | 97% | BP-6 | 3% | Heptane | Present Invention |
| S-7 | LPS | 97% | BP-7 | 3% | Heptane | Present Invention |
| S-8 | LPS | 97% | BP-8 | 3% | Heptane | Present Invention |
| S-9 | LPS | 97% | BP-9 | 3% | Heptane | Present Invention |
| S-10 | LPS | 97% | BP-10 | 3% | Heptane | Present Invention |
| S-11 | LPS | 97% | BP-11 | 3% | Heptane | Present Invention |
| S-12 | LPS | 97% | BP-12 | 3% | Heptane | Present Invention |
| S-13 | LPS | 97% | BP-13 | 3% | Heptane | Present Invention |
| T-1 | LPS | 97% | BPC-1 | 3% | Heptane | Comparative Example |

<Preparation of Composition for Positive Electrode Layer>

180 zirconia beads having a diameter of 5 mm were injected into a 45 mL zirconia container (manufactured by Fritsch Japan Co., Ltd.), and LPS synthesized above (2.0 g), a dispersion liquid of binder particles (0.1 g in terms of the solid content), and a dispersion medium (22 g) were injected thereinto as shown in Table 3. After that, the container was set in a planetary ball mill P-7 manufactured by Fritsch Japan Co., Ltd., and the components were stirred at a temperature of 25° C. and a rotation speed of 300 rpm for two hours. After that, a positive electrode active material (7.9 g) shown in Table 5 was injected thereinto, the container was, again, set in the planetary ball mill P-7, and the components were continuously mixed together at a temperature of 25° C. and a rotation speed of 100 rpm for 15 minutes. Individual compositions for a positive electrode layer P-1 to P-14 and V-1 were obtained in the above-described manner.

TABLE 3

| No. | Positive electrode active material | Inorganic solid % electrolyte | % Binder particles | Dispersion % medium | Note |
|---|---|---|---|---|---|
| P-1 | NMC | 79 LPS | 20 BP-1 | 1 Heptane | Present Invention |
| P-2 | NMC | 79 LPS | 20 BP-1 | 1 Heptane | Present Invention |
| P-3 | NMC | 79 LPS | 20 BP-2 | 1 Heptane | Present Invention |
| P-4 | NMC | 79 LPS | 20 BP-3 | 1 Heptane | Present Invention |
| P-5 | NMC | 79 LPS | 20 BP-4 | 1 Heptane | Present Invention |
| P-6 | NMC | 79 LPS | 20 BP-5 | 1 Heptane | Present Invention |
| P-7 | NMC | 79 LPS | 20 BP-6 | 1 Heptane | Present Invention |
| P-8 | NMC | 79 LPS | 20 BP-7 | 1 Heptane | Present Invention |
| P-9 | NMC | 79 LPS | 20 BP-8 | 1 Heptane | Present Invention |
| P-10 | NMC | 79 LPS | 20 BP-9 | 1 Heptane | Present Invention |
| P-11 | NMC | 79 LPS | 20 BP-10 | 1 Heptane | Present Invention |
| P-12 | NMC | 79 LPS | 20 BP-11 | 1 Heptane | Present Invention |

TABLE 3-continued

| No. | Positive electrode active material | % | Inorganic solid electrolyte | % | Binder particles | % | Dispersion medium | Note |
|---|---|---|---|---|---|---|---|---|
| P-13 | NMC | 79 | LPS | 20 | BP-12 | 1 | Heptane | Present Invention |
| P-14 | NMC | 79 | LPS | 20 | BP-13 | 1 | Heptane | Present Invention |
| V-1 | NMC | 79 | LPS | 20 | BPC-1 | 1 | Heptane | Comparative Example |

[Notes of Table]
NMC; $Li(Ni_{1/3}Mn_{1/3}Co_{1/3})O_2$ Nickel, manganese, lithium cobalt oxide (Nippon Chemical Industrial Co., Ltd.)

<Preparation of Composition for Negative Electrode Layer>

180 zirconia beads having a diameter of 5 mm were injected into a 45 mL zirconia container (manufactured by Fritsch Japan Co., Ltd.), and the above-synthesized LPS (3.9 g), a dispersion liquid of binder particles (0.1 g in terms of the solid content), and heptanes (22 g) as a dispersion medium were injected thereinto. After that, the container was set in a planetary ball mill P-7 manufactured by Fritsch Japan Co., Ltd., the components were stirred at a temperature of 25° C. and a rotation speed of 300 rpm for two hours. After that, a negative electrode active material (6.0 g) shown in Table 4 was injected thereinto, the container was, again, set in the planetary ball mill P-7, and the components were continuously mixed together at a temperature of 25° C. and a rotation speed of 100 rpm for 15 minutes. Compositions for a negative electrode layer N-1 to N-14 and O-1 were obtained in the above-described manner.

TABLE 4

| No. | Negative electrode active material | % | Inorganic solid electrolyte | % | Binder particles | % | Dispersion medium | Note |
|---|---|---|---|---|---|---|---|---|
| N-1 | Graphite | 60 | LPS | 39 | BP-1 | 1 | Heptane | Present Invention |
| N-2 | LTO | 60 | LPS | 39 | BP-1 | 1 | Heptane | Present Invention |
| N-3 | Graphite | 60 | LPS | 39 | BP-2 | 1 | Heptane | Present Invention |
| N-4 | Graphite | 60 | LPS | 39 | BP-3 | 1 | Heptane | Present Invention |
| N-5 | Graphite | 60 | LPS | 39 | BP-4 | 1 | Heptane | Present Invention |
| N-6 | Graphite | 60 | LPS | 39 | BP-5 | 1 | Heptane | Present Invention |
| N-7 | Graphite | 60 | LPS | 39 | BP-6 | 1 | Heptane | Present Invention |
| N-8 | Graphite | 60 | LPS | 39 | BP-7 | 1 | Heptane | Present Invention |
| N-9 | Graphite | 60 | LPS | 39 | BP-8 | 1 | Heptane | Present Invention |
| N-10 | Graphite | 60 | LPS | 39 | BP-9 | 1 | Heptane | Present Invention |
| N-11 | Graphite | 60 | LPS | 39 | BP-10 | 1 | Heptane | Present Invention |
| N-12 | Graphite | 60 | LPS | 39 | BP-11 | 1 | Heptane | Present Invention |
| N-13 | Graphite | 60 | LPS | 39 | BP-12 | 1 | Heptane | Present Invention |
| N-14 | Graphite | 60 | LPS | 39 | BP-13 | 1 | Heptane | Present Invention |
| O-1 | Graphite | 60 | LPS | 39 | BPC-1 | 1 | Heptane | Comparative Example |

<Notes of Table>

LTO: $Li_4Ti_5O_{12}$ (lithium titanium oxide)

<Production of Positive Electrode Sheet for all-Solid State Secondary Battery>

The composition for a positive electrode layer P-1 was applied onto a 20 µm-thick aluminum foil using the Baker type applicator (trade name: SA-201, manufactured by Tester Sangyo Co., Ltd.) and heated at 80° C. for two hours, thereby drying the composition for a positive electrode layer. After that, the dried composition for a positive electrode layer P-1 was heated (at 80° C.) and pressurized (600 MPa for one minute) using a heat pressing machine so as to obtain a predetermined density, thereby producing a positive electrode sheet for an all-solid state secondary battery having an 80 µm-thick positive electrode active material layer.

Next, the solid electrolyte composition S-1 was applied on the obtained positive electrode active material layer using the Baker type applicator and heated at 80° C. for two hours, thereby drying solid electrolyte composition. After that, the dried solid electrolyte composition S-1 was heated (at 80° C.) and pressurized (600 MPa for one minute) using a heat pressing machine so as to obtain a predetermined density, thereby producing a positive electrode sheet for an all-solid state secondary battery including a 30 µm-thick solid electrolyte layer.

<Production of Negative Electrode Sheet for all-Solid State Secondary Battery>

The composition for a negative electrode layer N-1 obtained above was applied onto a 20 µm-thick stainless steel foil using the Baker type applicator and heated at 80° C. for two hours, thereby drying the composition for a negative electrode layer N-1. After that, the dried composition for a negative electrode layer was heated (at 120° C.) and pressurized (at a pressure of 600 MPa for one minute) using a heat pressing machine so as to obtain a predetermined density, thereby producing a negative electrode sheet for an all-solid state secondary battery having a negative electrode active material layer having a film thickness of 110 µm.

<Production of all-Solid State Secondary Battery>

A disc-shaped piece having a diameter of 14.5 mm was cut out from the positive electrode sheet for an all-solid state secondary battery obtained above, was put into a 2032-type stainless steel coin case 11 into which a spacer and a washer were combined, and the negative electrode sheet for an all-solid state secondary battery cut out to a diameter of 15 mm was overlaid on the solid electrolyte layer so that the electrode layer came into contact with the solid electrolyte layer. The coin case 11 was swaged, thereby producing all-solid state secondary batteries No. 201. All-solid state secondary batteries Nos. 202 to 214 and c21 were produced in the same manner.

<Evaluation of Dispersibility>

The composition for a negative electrode layer was added to a glass test tube having a diameter of 10 mm and a height of 15 cm up to a height of 10 cm and left to stand for 15 hours, and the height of a separated supernatant was measured, thereby evaluating the dispersibility. In the present test, the evaluation standards of "C" or higher are pass.

—Evaluation Standards—

A: The height of the supernatant/the height of the full amount of the dispersion <0.1

B: 0.1≤ the height of the supernatant/the height of the full amount of the dispersion <0.3

C: 0.3≤ the height of the supernatant/the height of the full amount of the dispersion <0.5

D: 0.5≤ the height of the supernatant/the height of the full amount of the dispersion <Evaluation of Adhesiveness (Bonding Property)>

A disc-like specimen having a diameter of 15 mm was cut out from the negative electrode sheet for an all-solid state secondary battery, a surface portion (observation region of 500 µm×500 µm) of the negative electrode layer in the cut-out sheet was observed using an optical microscope for inspection (ECLIPSE Ci (trade name), manufactured by Nikon Corporation), and the presence and absence of chips, cracks, and fissures in the solid electrolyte layer and the occurrence of peeling of the solid electrolyte layer from the aluminum foil (collector) were evaluated using the following standards. In the present test, the evaluation standards of "C" or higher are pass.

—Evaluation Standards—

A: No defects (chips, cracks, fissures, and peeling) were observed

B: The area of a defect portion was more than 0% and 20% or less of the total area of the observation subject.

C: The area of a defect portion was more than 20% and 70% or less of the total area of the observation subject.

D: The area of a defect portion was more than 70% of the total area of the observation subject.

<Evaluation of Resistance>

Each of the all-solid state secondary batteries produced above was evaluated using a charge and discharge evaluation device TOSCAT-3000 (trade name, manufactured by Toyo System Corporation). The all-solid state secondary battery was charged at a current density of 0.1 mA/cm$^2$ until the battery voltage reached 4.2 V. The all-solid state secondary battery was discharged at a current density of 0.1 mA/cm$^2$ until the battery voltage reached 2.5 V. The charging and discharge were repeated, the discharge capacity after three cycles (the quantity of electricity per gram of the mass of the active material) was scanned, and the resistance was evaluated using the following standards. A high discharge capacity indicates a low resistance. In the present test, the evaluation standards of "C" or higher are pass.

—Evaluation Standards—

A: 120 mAh/g or higher

B: 100 mAh/g or higher and lower than 120 mAh/g

C: 80 mAh/g or higher and lower than 100 mAh/g

D: Lower than 80 mAh/g

<Evaluation of Cycle Characteristics (Discharge Capacity Retention)>

The cycle characteristics of each of the all-solid state secondary batteries produced above were evaluated using a charge and discharge evaluation device TOSCAT-3000. The all-solid state secondary battery was charged at a current density of 0.1 mA/cm$^2$ until the battery voltage reached 4.2 V. The all-solid state secondary battery was discharged at a current density of 0.1 mA/cm$^2$ until the battery voltage reached 2.5 V. Three cycles of charging and discharging were repeated under the above-described conditions, thereby carrying out initialization.

Each of the initialized all-solid state secondary batteries was charged at a current density of 0.2 mA/cm$^2$ until the battery voltage reached 4.2 V and then discharged at a current density of 0.2 mA/cm$^2$ until the battery voltage reached 2.5 V. The above-described charging and discharging was considered as one cycle, and the charging and discharging was repeated.

In this charging and discharging cycle, the discharge capacity at the first cycle of this charging and discharging after the initialization was considered as 100%, and the number of cycles repeated until the discharge capacity retention reached 80% was evaluated using the following standards. In the present test, the evaluation standards of "C" or higher are pass.

—Evaluation Standards—
A: 200 cycles or more
B: 100 cycles or more and less than 200 cycles
C: 50 cycles or more and less than 100 cycles
D: Less than 50 cycles

TABLE 5

| | Cell constitution | | | | | | Discharge |
| No. | Positive electrode active material layer | Solid electrolyte layer | Negative electrode active material layer | Dispersibility | Adhesiveness | Resistance | capacity retention |
| --- | --- | --- | --- | --- | --- | --- | --- |
| 201 | P-1 | S-1 | N-1 | B | B | B | C |
| 202 | P-2 | S-1 | N-2 | C | C | B | C |
| 203 | P-3 | S-2 | N-3 | A | B | A | B |
| 204 | P-4 | S-3 | N-4 | A | B | A | A |
| 205 | P-5 | S-4 | N-5 | B | C | B | B |
| 206 | P-6 | S-5 | N-6 | A | A | A | A |
| 207 | P-7 | S-6 | N-7 | A | B | A | B |
| 208 | P-8 | S-7 | N-8 | A | C | B | B |
| 209 | P-9 | S-8 | N-9 | A | A | B | A |
| 210 | P-10 | S-9 | N-10 | B | C | B | C |
| 211 | P-11 | S-10 | N-11 | B | B | B | B |
| 212 | P-12 | S-11 | N-12 | C | C | B | C |
| 213 | P-13 | S-12 | N-13 | C | B | B | C |
| 214 | P-14 | S-13 | N-14 | B | B | C | B |
| C21 | V-1 | T-1 | O-1 | D | C | D | D |

As is clear from Table 5, it is found that the solid electrolyte composition (composition for a negative electrode layer) of the present invention has a favorable dispersibility. In addition, the all-solid state secondary battery electrode sheet (the negative electrode sheet for an all-solid state secondary battery) of the present invention has a favorable adhesiveness. Furthermore, the all-solid state secondary battery of the present invention has a low resistance and excellent cycle characteristics.

The present invention has been described together with the embodiment; however, unless particularly designated, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: coin case
12: sheet for all-solid state secondary battery
13: cell for measuring ion conductivity (coin battery)

What is claimed is:
1. A solid electrolyte composition comprising:
an inorganic solid electrolyte having conductivity for ions of metals belonging to Group I or II of the periodic table; and
a binder,
wherein a polymer constituting the binder includes a constituent component derived from a macromonomer having a mass-average molecular weight of 1,000 or more and less than 1,000,000 and includes a ring structure of two or more rings, and
wherein the polymer constituting the binder includes a repeating unit having a group including the ring structure of two or more rings in a side chain.

2. The solid electrolyte composition according to claim 1, wherein the repeating unit having a group including the ring structure of two or more rings is incorporated into the constituent component derived from a macromonomer.

3. The solid electrolyte composition according to claim 1, wherein a content of the repeating unit having a group including the ring structure of two or more rings is 10% by mass or more and 85% by mass or less with respect to 100% by mass of the polymer constituting the binder.

4. The solid electrolyte composition according to claim 1, wherein the polymer constituting the binder has a particle shape and has an average particle diameter of 10 nm or more and 50,000 nm or less.

5. The solid electrolyte composition according to claim 1, wherein the group including the ring structure of two or more rings has a structure in which at least one hydrogen atom of a compound represented by General Formula (D) is substituted with a bonding site,

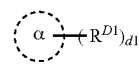

General Formula (D)

in General Formula (D), a ring α represents a ring of two or more rings, $R^{D1}$ represents a substituent that bonds to a constituent atom of the ring α, and d1 represents an integer of 1 or more; in a case in which d1 is 2 or more, a plurality of $R^{D1}$'s may be identical to or different from each other, and $R^{D1}$'s substituting adjacent atoms may bond together and thus form a ring.

6. The solid electrolyte composition according to claim 5, wherein the structure in which at least one hydrogen atom of the compound represented by General Formula (D) is substituted with a bonding site is a structure in which at least one hydrogen atom of a compound represented by General Formula (1) or an aliphatic hydrocarbon represented by General Formula (2) is substituted with the bonding site,

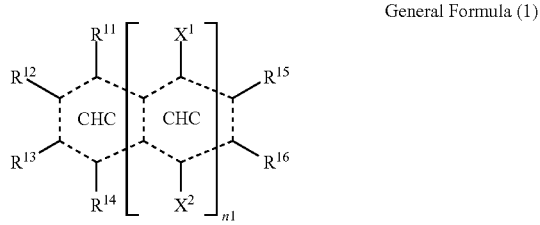

General Formula (1)

in General Formula (1), CHC represents a benzene ring, a cyclohexane ring, a cyclohexene ring, or a cyclohexadiene ring, n1 represents an integer of 0 to 8, $R^{11}$ to $R^{16}$ each independently represent a hydrogen atom or a substituent, $X^1$ and $X^2$ each independently represents a hydrogen atom or a substituent; here, in $R^{11}$ to $R^{16}$, $X^1$, and $X^2$, mutually adjacent groups may bond to each other and thus form a 5 or 6-membered ring; however, in a case in which n1 is 0, any one substituent of $R^{11}$ to $R^{16}$ is $-(CHC^1)_{m1}-Rx$ or any two of $R^{11}$ to $R^{16}$ bond together and thus form $-(CHC^1)_{m1}-$; here, $CHC^1$ represents a phenylene group, a cycloalkylene group, or a cycloalkenylene group, m1 represents an integer of 2 or more, Rx represents a hydrogen atom or a substituent, in addition, in a case in which n1 is 1, in $R^{11}$ to $R^{16}$, $X^1$, and $X^2$, at least two atoms or substituents that are adjacent to each other bond together and thus form a benzene ring, a cyclohexane ring, a cyclohexene ring, or a cyclohexadiene ring,

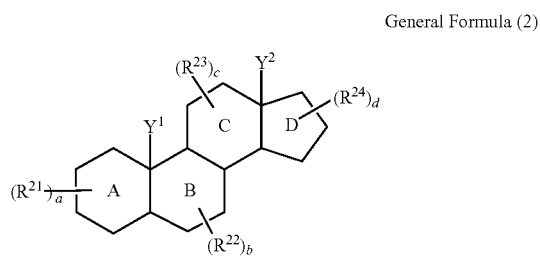

General Formula (2)

in General Formula (2), $Y^1$ and $Y^2$ each independently represent a hydrogen atom, a methyl group, or a formyl group, $R^{21}$, $R^{22}$, $R^{23}$, $R^{24}$ each independently represent a substituent, and a, b, c, and d each independently represents an integer of 0 to 4, here, an A ring may be a saturated ring or an unsaturated ring having one or two double bonds or an aromatic ring, a B ring and a C ring may be an unsaturated ring having one or two double bonds; meanwhile, in a case in which a, b, c, and d are an integer of 2 to 4, adjacent $R^{21}$'s, $R^{22}$'s, $R^{23}$'s, and/or $R^{24}$'s may bond together and thus form a ring.

7. The solid electrolyte composition according to claim 1, wherein the inorganic solid electrolyte is represented by Formula (1), $$L_{a1}M_{b1}P_{c1}S_{d1}A_{e1} \quad (1)$$

in the formula, L represents at least one element selected from the group consisting of Li, Na, and K, M represents at least one element selected from the group consisting of B, Zn, Sn, Si, Cu, Ga, Sb, Al, and Ge, A represents I, Br, Cl, or F, a1 to e1 represent the compositional ratios among the respective elements, and a1:b1:c1:d1:e1 satisfies 1 to 12:0 to 5:1:2 to 12:0 to 10.

8. The solid electrolyte composition according to claim 1, wherein the polymer constituting the binder is a polyamide, a polyimide, a polyurea, a polyurethane, or an acrylic resin.

9. The solid electrolyte composition according to claim 1, wherein the polymer constituting the binder includes at least one constituent component selected from the group consisting of a (meth)acrylic acid component, a (meth)acrylic acid ester component, and a (meth)acrylonitrile component.

10. The solid electrolyte composition according to claim 1, further comprising:
an active material capable of intercalating and deintercalating ions of metals belonging to Group I or Group II of the periodic table.

11. The solid electrolyte composition according to claim 10, wherein the active material is a carbonaceous material.

12. An electrode sheet for an all-solid state secondary battery, comprising:
a film of the solid electrolyte composition according to claim 10 on a base material.

13. A method for manufacturing an electrode sheet for an all-solid state secondary battery, comprising:
disposing the solid electrolyte composition according to claim 10 on a base material; and
forming a film of the solid electrolyte composition.

14. A sheet for an all-solid state secondary battery, comprising:
a film of the solid electrolyte composition according to claim 1 on a base material.

15. An all-solid state secondary battery comprising:
a positive electrode active material layer;
a negative electrode active material layer; and
a solid electrolyte layer,
wherein at least one of the positive electrode active material layer, the negative electrode active material layer, and the solid electrolyte layer is a layer constituted of the solid electrolyte composition according to claim 1.

16. A method for manufacturing a sheet for an all-solid state secondary battery, comprising:
disposing the solid electrolyte composition according to claim 1 on a base material; and
forming a film of the solid electrolyte composition.

17. A method for manufacturing an all-solid state secondary battery, comprising:
manufacturing an all-solid state secondary battery using the manufacturing method according to claim 16.

* * * * *